US006049819A

United States Patent [19]
Buckle et al.

[11] Patent Number: 6,049,819
[45] Date of Patent: Apr. 11, 2000

[54] COMMUNICATIONS NETWORK INCORPORATING AGENT ORIENTED COMPUTING ENVIRONMENT

[75] Inventors: Phillip Jonathan Buckle, Ware; Robert George Hadingham, Harlow, both of United Kingdom

[73] Assignee: Nortel Networks Corporation, Montreal, Canada

[21] Appl. No.: 09/006,380

[22] Filed: Jan. 13, 1998

[30] Foreign Application Priority Data

Dec. 10, 1997 [GB] United Kingdom .................... 9726086

[51] Int. Cl.[7] .................................................. G06F 15/16
[52] U.S. Cl. ........................ 709/202; 709/201; 709/223; 709/250; 707/10; 707/103; 707/104
[58] Field of Search .................................... 709/200–203, 709/220–221, 223–226, 249–252; 707/3–4, 10, 101–104

[56] References Cited

U.S. PATENT DOCUMENTS

| | | | |
|---|---|---|---|
| 5,367,635 | 11/1994 | Bauer et al. | 709/221 |
| 5,603,031 | 2/1997 | White | 709/303 |
| 5,761,428 | 6/1998 | Sidey | 709/203 |
| 5,870,545 | 2/1999 | Davis et al. | 709/201 |
| 5,884,046 | 3/1999 | Antonov | 709/238 |
| 5,887,171 | 3/1999 | Tada et al. | 707/4 |
| 5,983,233 | 11/1999 | Potonniee | 707/103 |

FOREIGN PATENT DOCUMENTS

| | | | |
|---|---|---|---|
| 0 358 408 | 3/1990 | European Pat. Off. | H04Q 3/00 |
| 0 467 546 | 1/1992 | European Pat. Off. | G06F 9/46 |
| 0 727 739 | 8/1996 | European Pat. Off. | G06F 9/44 |
| 2 246 218 | 1/1992 | United Kingdom | G06F 11/14 |
| 2 289 598 | 11/1995 | United Kingdom | G06F 9/46 |
| 2 305 811 | 4/1997 | United Kingdom | H04M 3/36 |
| WO 93/16543 | 8/1993 | WIPO | H04M 3/42 |
| WO 94/28683 | 12/1994 | WIPO | H04Q 3/00 |
| WO 95/15635 | 6/1995 | WIPO | H04L 12/24 |
| WO 95/30317 | 11/1995 | WIPO | H04Q 7/24 |

OTHER PUBLICATIONS

F1PA 97 Draft specification Part 1 "Agent Management, Jun. 1997".
F1PA 97 Draft specification Part 2 "Agent Communication Language, Jun. 1997".
F1PA 97 Draft specification Part 3 "Agent Software Communication, Jun. 1997".

*Primary Examiner*—Zarni Maung
*Assistant Examiner*—Bi-Iarat Barot
*Attorney, Agent, or Firm*—Lee, Mann, Smith, McWilliams, Sweeney & Ohlson

[57] ABSTRACT

An agent oriented computing environment is disclosed comprising an "agent shell" means which can be used by developers for constructing agent computing entities according to their own functionality requirements; an agent enabling layer, providing basic communication, brokering, and negotiation facilities between agent computing entities; and an underlying transport mechanism based on a prior art CORBA platform. Agents communicate with each other using an agent communication language enabling them to interact to domain specific problems. Agents can pass information to each other in ACL messages describing their own vocabularies concerning logic (ontologies). Various services for locating and connecting agents are provided in the agent oriented environment, such as a broker service for locating and finding agents. A collection of agents may communicate with each other where the agents remain static, maintaining their physical locations on their corresponding host physical resource devices, or alternatively agents may be transported across a plurality of physical resources, through the CORBA platform. The environment supports encapsulation of legacy objects, databases, standard and proprietary protocols and interfaces.

34 Claims, 15 Drawing Sheets

COMMUNICATIONS NETWORK INCORPORATING AGENT ORIENTED COMPUTING ENVIRONMENT

FIELD OF THE INVENTION

The present invention relates to a method and means for supporting agent oriented programming particularly, although not exclusively over a set of distributed physical resources.

BACKGROUND TO THE INVENTION

In a modern communications network, there are provided a large number of physical resources, comprising hardware and software elements, the physical resources cooperating to provide services such as conventional voice telephone, facsimile and data transmission services. Particularly in the telecommunications industry, there exists a bewildering array of proprietary equipment items, eg broadband network elements including central office exchange switches, wireless mobile network equipment, access network equipment and the like, operating a large number of standard and proprietary protocols and interfaces. For provision of services of conventional communications networks, and for internal control and management of those communications networks, in recent years software applications have been growing in terms of size, complexity, diversity and importance. This has resulted in substantial development times for new communications equipment items having complex software controls and offering complex software controlled services.

Further, technologies of telecommunications and computers, which in the past have been separate, are converging at an increasing rate, the internet providing an alternative communications medium to national and international connection oriented telephone networks.

In this context, the viability of communications services and applications is strongly dependent on organization of software control systems, and how quickly changes to software can be implemented. An extent of the scale of the problem of bringing a new communications service to market is exemplified by a conventional central office exchange switch, in which software controls of the switch may comprise several million lines of code. For introduction of new services and features supported by the central office switch, full software upgrades may be released over a time scale of two to three years, resulting in a time to market for new services of similar time scale.

Within the computing and communications industries, various programming technologies have been adopted with a view to improving the manageability of highly complex physical resources. One such technology is broadly categorized as Object Oriented Programming (OOP). Object Oriented Programming facilitates a natural model of a problem domain, modeling a problem or task in terms of objects and relationships between those objects. An object is an abstraction of a set of real world things such that:

all of the real world things in the set (termed instances) have the same characteristics; and all instances are subject to and conform to the same rules.

Object oriented programming allows some reuse of programming effort, by reuse of sub-classes. For example, where a set of physical resources have constituent components which recur, by modeling those recurring elements in an object oriented manner, an amount of programming effort can be re-used.

Mainstream prior art object oriented programming languages such as Java or C++ enable direct reuse of classes, but impose a number of restrictions. For example only classes written in the same language can be bound together to form a new application. Java supports effective run-time linking of classes, but the interfaces are pre-determined. Java supports integration with C/C++ code, but to achieve this integration, special "glue" code must be produced. An ability to bind classes also requires that a program developer understands the interface for the services offered, which are required to be hard coded into an application.

At the same time as the trend towards complexity and diversity of physical resource types and protocols, there is a trend for telecommunication systems and computing systems to become geographically distributed instead of control of services and data processing being located at centralized locations, in order to make better use of geographically disparate physical resources, a trend is for control functions and data processing functions to be carried out simultaneously at a plurality of different geographical locations within the same system. Distribution of control and data processing functions gives rise to many problems concerning interfacing and communication between different physical resources in an efficient manner, a problem which is compounded by the variety and large number of prior art physical resource types and protocols in use.

CORBA is a standard for distributed objects being developed by the Object Management Group (OMG). It provides an infrastructure allowing objects to converse, independent of the specific platforms and techniques used to implement the objects. CORBA is an application frame work that provides interoperability between objects, built-in (possibly) different languages, running on (possibly) different machines in heterogenous distributed environments. Core to CORBA is the Interface Description Language (IDL) and the Object Services. IDL provides a way for services of components to be described, hiding implementation details. Object Services are domain independent interfaces that are used by many distributed object programs to fulfill roles such as enabling a client to reference objects by names (ie the Naming Service).

On the other hand, another prior art approach aimed at improving the manageability of vastly distributed, hetergenous complex physical resources has emerged, being loosely termed "Agent Oriented Programming" (AOP). Agent oriented programming has been applied in the field of telecommunications. Cooperating intelligent agents have been described which may be used to provide quality and flexibility of control sufficient to meet demands of modem information technology services, in spite of problems presented by a multiplicity of protocols and communications platforms.

The technology of agent oriented programming is in its infancy, and a standardized, or common definition of an "agent" has yet to be accepted. In the context of this disclosure and the specific implementations of the present invention described hereafter, an agent is considered to be a piece of software, which is able to perform specific pre-defined tasks autonomously (on behalf of a user, an application or another agent). Such agents could be either stationary, providing the necessary intelligence, or mobile so that they can move between different incompatible systems to access remote resources or even meet other agents (or activate them) and co-operate with them. Key properties of an agent are considered to be peer level communication and co-operation skills, autonomous execution, adaptive and reactive behavior. Agents are thus considered highly suited for dynamic telecommunications environments. However, conventional disclosures relating to agent oriented programming techniques tend to focus on mobility of agents over different physical resources and protocol platforms, without addressing the specific issues of how agent entities are able to interact with each other in a general way to provide specific functionality for control of physical resources, and provision of services. Prior art approaches focus on packaging up an agent and transporting the agent around a network. For example, a functionality capable of being performed by an agent may be required by an application at a particular location. The application may request the functionality of that agent, resulting in the agent being transported to the physical location of the application, ie the agent is packaged up and communicated over a network, and once arriving at the location of the application, the agent then performs the functionality requested by the application.

SUMMARY OF THE INVENTION

One object of the present invention is to provide an infrastructure framework or enabling an agent computing entity oriented environment over a wide variety of physical resources.

Another object of the present invention is to provide an environment in which agent computing entities can efficiently identify each other and quickly assess functionality of their peer agents.

A further object of the present invention is to allow agent computing entities to communicate with each other using a common set of syntax and a common set of message exchanges.

According to one aspect of the present invention there is provided a network comprising:
  a plurality of said physical resources comprising a plurality of processors, and a plurality of memory means;
  a plurality of agent computing entities residing at said physical resources;
  a means for communicating between said physical resources; and
  means for interfacing said agent computing entities to said communications means such that said agent computing entities are able to communicate with each other over said communications network.

Preferably, a said agent computing entity is capable of performing a specific predefined task autonomously. The agent may perform a task such as a data processing task or a task requiring artificial intelligence, eg pattern recognition or searching. An agent computing entity may perform a task on behalf of a user, an application or another agent. Preferably, said agent computing entities may communicate on a peer level. Preferably, said agent computing entities exhibit co-operation with other computing and/or communications entities. Said agent computing entities may be adaptive and/or reactive to each other and/or to other said entities.

Preferably said communications means comprises a CORBA (Common Object Request Broker Architecture) platform.

Preferably said interface means comprises means for interfacing said computing entity to said communications means.

Said interface means may comprise an agent communication language. Said agent communication language may comprise a Foundation for Intelligent Physical Agents (FIPA) agent communications language. Said agent communicational language may comprise KQML (Knowledge Query and Manipulation Language).

Preferably a said agent computing performs a predetermined task autonomously of other ones of said plurality of agent computing entities.

A said agent computing entity may comprise an intelligence component. A said agent computing entity may comprise a human factor component.

Preferably a said agent computing entity representation of a system comprises an object oriented representation.

Preferably said agent computing entity cooperates with at least one other of said agent computing entities.

An agent computing entity may actively seek other agents by reference to a broker service. The broker service may notify one or more agent computing entities of the existence of an agent computing entity registered with said broker.

A said agent computing entity may receive details of functionality provided by another said agent computing entity over said communications means.

A said first said agent computing entity may correspond with a second said agent computing entity via the third said agent computing entity, said third agent computing entity configured to perform a teach functionality in which said third agent computing entity communicates an ontology data between said first and second agent computing entities.

By transmitting an ontology between agents, task functionality available at said first agent computing entity may be made available to said second agent computing entity in a defined and unambiguous form.

According to a second aspect of the present invention there is provided a computing infrastructure means for supporting a population of agent computing entities, said infrastructure comprising:
  a communications platform supporting communications between said agent computing entities;
  a shell means for a said agent computing entity, said shell means comprising:
    an agent communications language element; and
    an interface means for interfacing between said agent communications language element and said communications platform.

Preferably said communications platform comprises a CORBA (Common Object Request Broker Architecture) platform. Preferably, said platform includes CORBA services. Said services preferably includes the services Names, Events, Externalization, Security and Trader.

Said interface means preferably interfaces to supported facilitation services or said CORBA platform.

Said agent communication language may comprise a Foundation for Intelligent Physical Agents (FIPA) agent communications language.

Said agent communication language may comprise a KQML (Knowledge Query and Manipulation Language).

Preferably, said interface means comprises an object capable of encapsulation of agent communications language messages in an interface definition language, delivering the ACL message to the appropriate agent with the use of CORBA and the specified CORBA services. Said object may exhibit an IDL interface stub which may be inferred by domain specific agent implementations. Alternatively, in a Java environment, said object could be implemented as a Bean and thus inferred by domain specific agent implementations.

Preferably said computing infrastructure further comprises a broker agent capable of introducing agents upon request. Said broker may maintain a list of agents and a list of services which they support. Said list may enable the broker agent to respond to requests received from other agents.

Preferably said computing infrastructure further comprises a physical resource configured as an agent naming server agent, said agent naming agent containing data describing locations of a plurality of agent computing entities connected with said computing infrastructure.

According to a third aspect of the present invention there is provided a distributed computing environment comprising a plurality of physical resources, each said physical resource comprising:

at least one data processor;
   at least one memory means capable of storing data signals;
   a set of control instructions configured for controlling said at least one processor to perform data processing operations on said data signals; and
   said physical resources configured as a plurality of computing entities, and a communications platform;
   said plurality of agent computing entities each comprising an interface for interfacing with said communications platform and one or more object representations of a modeled system.

Preferably said communications platform comprises a CORBA (common object request broker architecture) platform.

Preferably said interface comprises an agent communications language.

According to a fourth aspect of the present invention there is provided in a computing environment comprising a plurality of distributed physical resources, each said physical resource comprising a processing means, a data storage means, and a control signal storage means, a method of transporting an agent computing entity between a first physical resource at a first location, and a second physical resource at a second location, said method comprising the steps of:

representing said agent entity as a set of messages in an agent communications language;
   transporting said messages over a CORBA platform between said first and second locations; and
   converting said messages back to code representing said agent computing entity.

The computing environment ("Agent world") itself does not impose restrictions on how a given agent is invoked at a remote site. "Agent world" facilitates the requirements of the chosen agent mobility model adopted by the implemented agent community. Such a model may form a part of the future FIPA standard or may follow a proprietary solution.

According to a fifth aspect of the present invention there is provided in an computing environment comprising a plurality of distributed physical resources, each said physical resource comprising a processor means, and a data storage means, wherein a plurality of computing entities are resident on said plurality of said physical resources, a method of data processing comprising:

interacting a first said computing entity with a second said computing entity by:
   i) said first computing entity packaging a set of data signals into one or more agent communication language messages;
   ii) transporting said agent communication language messages to said second computing entity over a CORBA platform; and
   iii) said second computing entity receiving said agent communication language messages and recovering said data signals therefrom.

Preferably said step of transporting said data over said CORBA platform comprises converting said messages of said agent communication language into an interface definition language capable of interfacing with said CORBA platform.

Said step of recovering said first data from said agent communication language messages may comprise:

receiving signals in the form of a CORBA event encoded in an interface definition language syntax from said CORBA platform; and
   converting said interface definition language syntax signals to agent communication language messages containing said first data.

According to a sixth aspect of the present invention there is provided in a computing environment comprising a plurality of distributed physical resources, each said physical resource comprising a processor means and a data storage means, wherein a plurality of agent computing entities are resident on said plurality of said physical resources, a method of interacting said agent computing entities with each other comprising the steps of:

a first said agent entity sending a message to a second said agent entity, said message containing data describing functionality available at said first agent entity;
   said second agent entity responding to said first agent entity by sending a message signal containing data describing functionality available at said second agent entity.

Preferably said data describing functionality comprises ontology data describing precise meanings of the agent communication language messages.

Said message signals may comprise agent communications language messages sent asynchronously over an externalization service of a CORBA platform.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
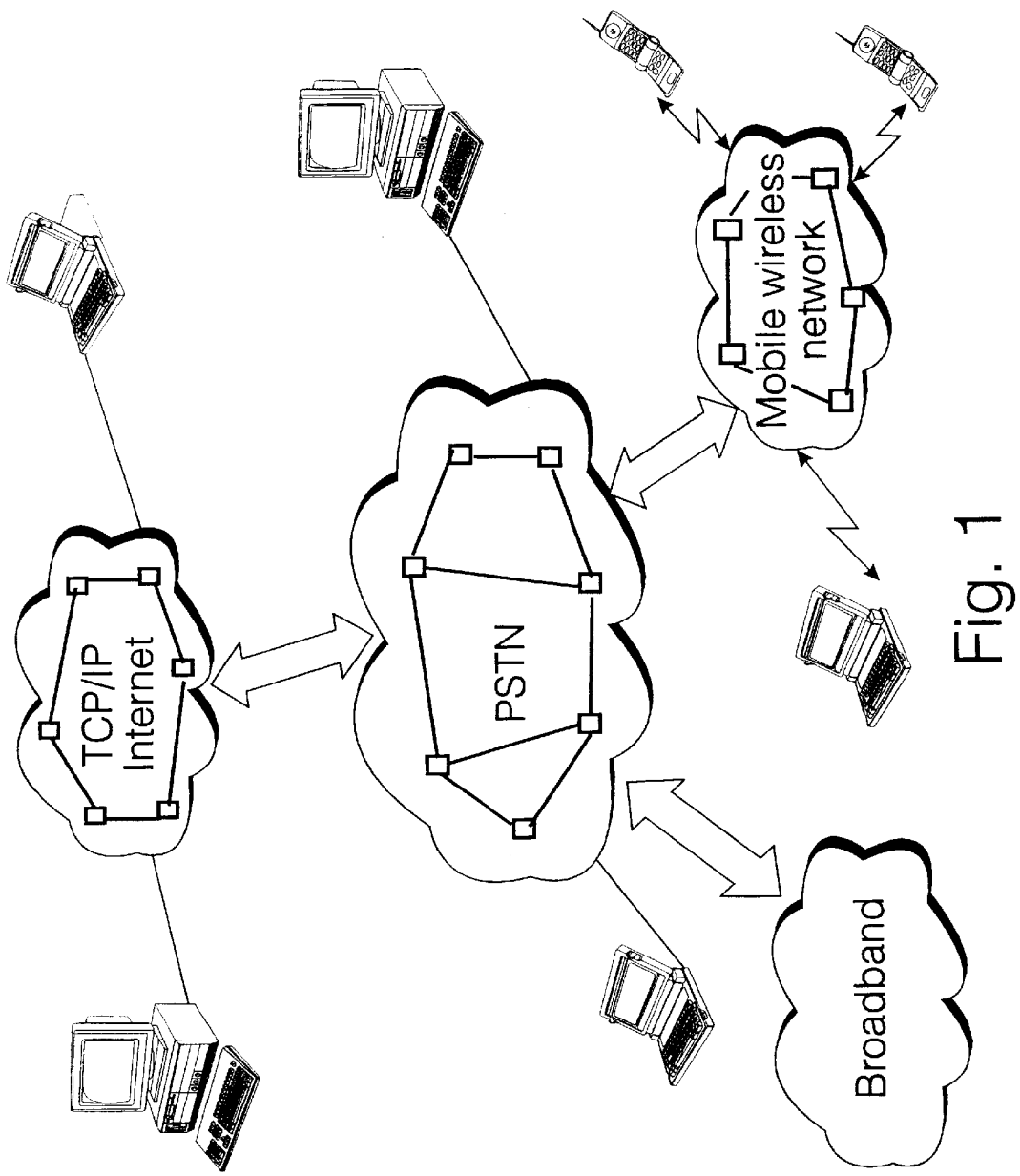
FIG. 1 herein illustrates a generalized communications environment capable of supporting a population of agent computing entities.

Referring to FIG. 1 herein, there is illustrated an example of a general computing environment, comprising a plurality of communicating physical resources. A physical resource may comprise any resource capable of carrying out a computing or data processing function, and will generally include a conventional processor element, an element of memory for storing data signals and an element of memory for storing control signals for controlling the processor to process the data. A physical resource may comprise for example a telecommunications switch, a mobile phone, or a personal or mainframe computer operating in accordance with one or a plurality of known operating systems, eg UNIX, Windows 95®/NT.

The plurality of physical resources are geographically distributed comprising the distributed computing environment shown in FIG. 1. The physical resources communicate with each other using a variety of known protocols, eg transmission control protocol/internet protocol (TCP/IP) or standard transmission protocols eg asynchronous transfer mode (ATM).

Figure 2:
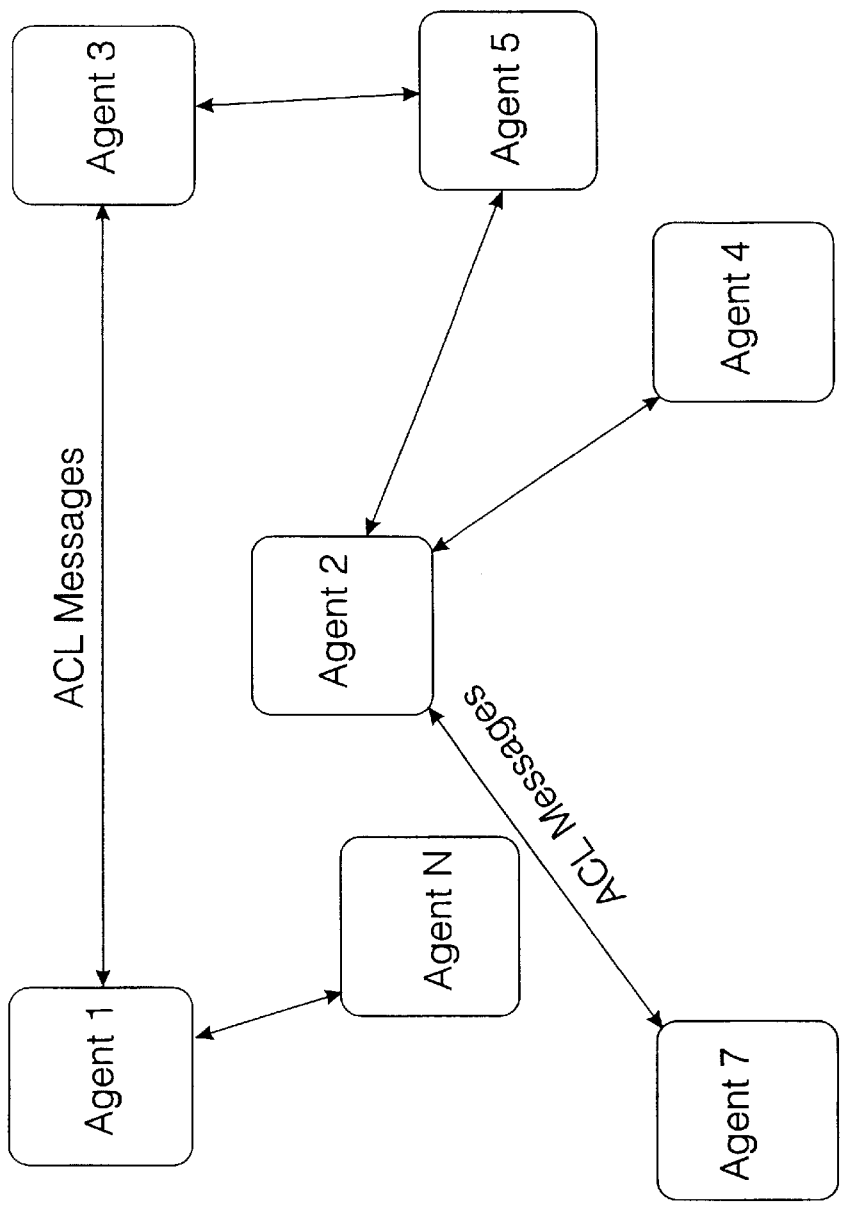
FIG. 2 illustrates schematically a logical view of communication between a plurality of agents.

Referring to FIG. 2 herein, there is illustrated schematically a broad logical overview of a plurality of agent computing entities according to a specific implementation of the present invention. A plurality of number N agent entities occupy a distributed computing environment, eg the environment of FIG. 1, in which each agent entity is capable of communicating with each other agent entity. Agent entities may be physically located anywhere within the computing environment. Geographically, the agent entities within the community may be resident on physical resources distributed internationally or nationally, at one extreme, or within a single physical resource, eg a work station or mainframe computer at another extreme. The computing environment may extend over a number of physical resources geographically separated or be contained within just one physical resource at a single location. For a physical resource to be capable of being included within the computing environment, it must have sufficient processing power and memory to support an agent entity, and sufficient communication capability for communicating with other physical resources comprising the computing environment. For an agent entity to be within the agent community, it must be capable of interacting with other agents comprising the agent community.

Figure 3:
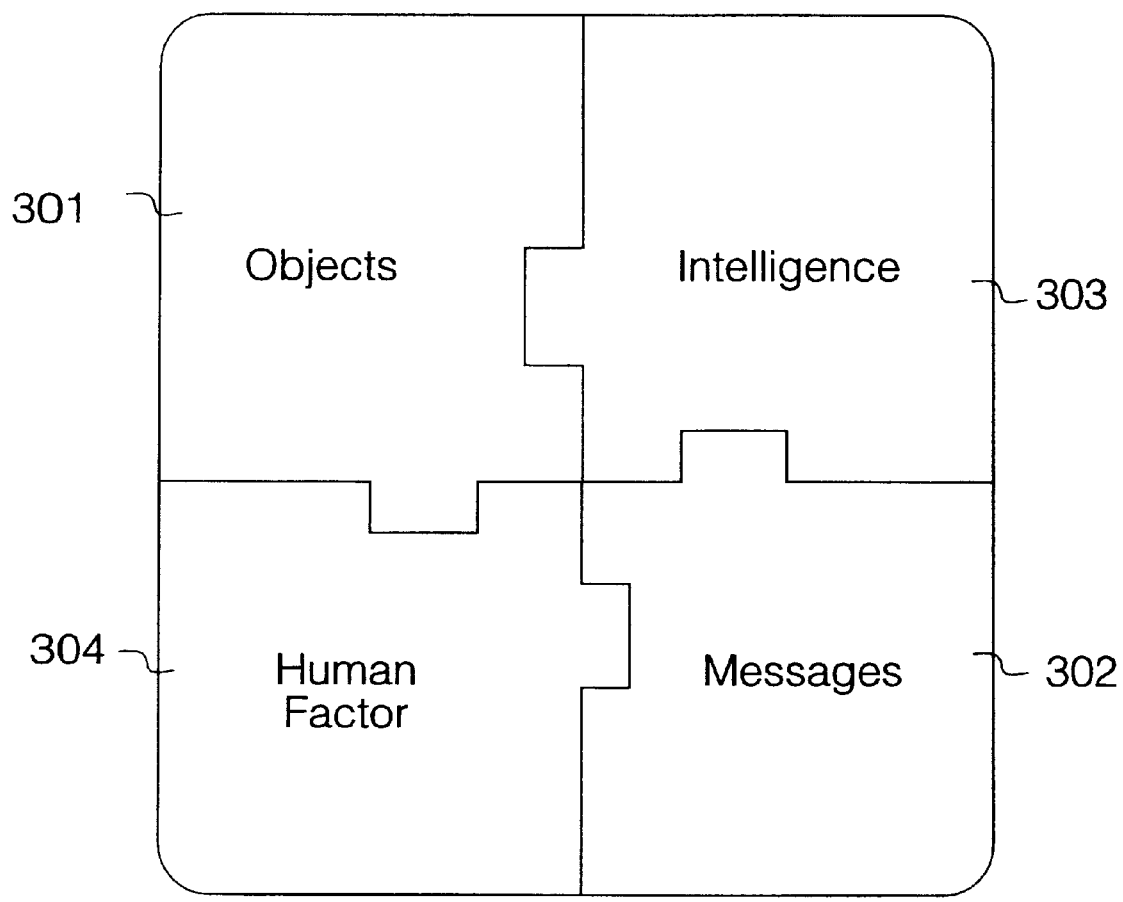
FIG. 3 herein illustrates schematically a functional overview of an agent computing entity.

Referring to FIG. 3 herein, there is illustrated a logical view of an agent entity according to a specific implementation of the present invention. Physically, an agent comprises a unit of functionality supported by a physical resource. The physical resource provides use of a processor, use of a data storage memory, and use of an area of memory for storing control signals for controlling the processing element to process data to implement the functionality of the agent entity. The agent's functionality may be provided in the form of an application residing on the physical resource. As mentioned above, the processing element, data storage element and control signal storage elements may be distributed across one or more individual machines. In another example of a specific deployment, a population of agents may reside on a single machine.

An agent is modeled as a cluster of objects, and is enclosed without external reference, except with the host system. Irrespective of physical location and supporting physical resource, an agent entity as described herein comprises the following components:

a set of one or more objects a messaging component An agent may also comprise the following elements:

an "intelligent" component a "human factor" component

An agent therefore has a transitive closure over all of a plurality of objects which a main object contains a reference to. The main object is identifiable by its assigned (chosen) agent name at the agent level, and by a GUID at the CORBA level. Agents having an intelligent component may be described as "intelligent agents".

In general an agent entity is capable of supporting a diverse range of functionalities within each of the above components. The following are illustrative examples of each of these components. The components are not limited to these examples.

A set of objects may comprise a coded representation of a real or logical system. The object may contain data describing characteristics of a modeled system, the data being structured in accordance with an object framework (an information model) illustrating how those characteristics are inter-related and interact with each other. An object typically contains a set of control signals, operating algorithms, control routines, procedural steps, data processing operations and the like carried out on the data describing the characteristics of the modeled system.

An agent communication language messaging component comprises an interface element which enables an agent to communicate with other agents. Such a component may comprise a de facto standard speech act messaging language, eg Knowledge Query Manipulation Language (KQML) proposed by Yannis Labrou and Tim Finin [A Proposal for a New KQML Specification: Yannis Labrou and Tim Finin, Feb. 3, 1997, Department of Computer Science and Electrical Engineering, University of Maryland, Baltimore County, Baltimore, Md. 21250, USA] or the standard Foundation for Intelligent Physical Agents agent communication language (FIPA ACL).

An "intelligent" component may comprise code containing a low level scripted form or intelligence, eg a set of "IF-THEN" statements, or an element of an artificial intelligence technique. The intelligent component may comprise for example a genetic algorithm, an algorithm operating a genetic programming technique, an algorithm operating a neural network technique, an algorithm operating a simulated annealing technique, a fuzzy logic technique, or an heuristic algorithm.

A "human factor" component comprises a code element which enables an agent to interact with other agents for the purpose of creating overall functionality which extends beyond that offered by a single agent. A human factor may encapsulate abstract concepts such as beliefs, responsibilities, autonomy, desires, intentions, which would normally be associated with a human as opposed to an object, to the extent that such abstract concepts can be reproduced as a set of control signals and data signals configured for controlling an underlying processor and memory of a physical resource. The "human factor" component may be partially or fully incorporated across the other components, eg as a consequence of operations of the intelligence component or the set of objects. A "human factor" component may manifest itself as being emergent from the other components of the agent entity. For example, an agent in an agent oriented environment may exist in order to perform a function or a role. For example, where the role of an agent is to check for computer viruses in a computer system, rather than passively wait for viruses to appear, the agent may be configured to actively seek out viruses, for example by periodically checking a boot sector, or other known entry points of a virus into a machine. As another example, in a telecommunications environment, an agent may monitor bandwidth or resources in a switch and may pro-actively warn of or deal with faults in the switch.

In an agent, in terms of bytes of control and data signals, the set of objects may predominate. For example, the set of objects may occupy of the order 75% of a memory space required to accommodate an agent entity, the remaining memory space being occupied by the messaging component, intelligence component, and "human factor" component. In agents having a higher "intelligent" or "human factor" component the proportion of memory occupied by objects may be reduced, for example an agent incorporating a Prolog implemented knowledge based system may have a relatively high proportion of "human factor" in terms of bytes of occupied compared to other elements of the agent. The messaging component stays relatively constant in absolute memory space terms, depending on efficiency of coding.

In order to enable interaction of agent entities as described herein above, criteria which need to be satisfied comprise the following:

all agent entities must have a physical means of communicating with each other interacting agents operate according to one or more ontologies. By ontology, it is meant that agents which interact with each other are capable of understanding a common set of messages which have a same meaning for each agent. A message references one ontology, however different messages may reference a plurality of different corresponding ontologies. Each agent references one or more ontologies. Whilst some agents in a community may reference a large number of ontologies, other agents may reference to only one ontology. A pair of agents may communicate with each other without the agents operating a same ontology, however such communication is not likely to be productive. To retrieve a productive interaction between two agents, each agent must operate the same ontology.

In the specific implementation presented herein, there is described a community of intelligent agent entities aimed at having particular application in a telecommunications environment in which a plurality of known network management systems may communicate over a known CORBA interface. A plurality of agent entities as described herein are capable of utilizing the CORBA interface to communicate with, e.g. existing prior art network management systems, legacy objects or other legacy equipment, but are also capable of communicating with each other forming a separate community of agent entities.

In the specific implementation of the present invention, the inventors propose an infrastructure for a community of agents including the use of a conventional common object request broker architecture (CORBA) platform [Common Object Request Broker: Architecture And Specification Version 2.1 August 1997, available from the Object Management Group Inc., Frammingham Corporate Center, 492 Old Connecticut Path, Frammingham, Massachusetts 01701, USA] for provisioning of the communications platform between different agent entities of a community, residing over a plurality of geographically distributed physical resources in conjunction with a template means provided for creating a community of agent computing entities, and including provision of a language server, an agent naming service and an agent broker. Use of a CORBA platform may have an advantage of allowing accessibility to UNIX based work stations as well as personal computers. A plurality of agent entities access the CORBA platform through an interface comprising a common interface definition language (IDL).

Agent computing entities interact with each other on a peer to peer basis using an agent communication language (ACL). One such agent communications language is the known Foundation for Intelligent Physical Agents agent communication layer (FIPA ACL), which forms the basis for the specific implementation in the best mode herein. Another such agent communication language is the conventional knowledge query and manipulation language (KQML). However, it will be understood by persons skilled in the art that the agent communication language need not be restricted to FIPA ACL or KQML.

Benefits which may accrue from the provision of a community of agents include greater reusability of programming effort. That is to say, control systems, algorithms, and control modules which have been coded to perform specific real world tasks for controlling a particular piece of physical resource, or solving a particular data processing problem, may be re-used where those tasks are relevant to controlling a new physical resource, or solving a new data processing problem. In prior art object oriented techniques, relationships between individual units of functionality (objects) representing either real world physical resources, or representing elements of data processing for solving specific problems, are set during compilation of coding to form an overall application for solving a particular problem or controlling a particular physical resource. However, agent oriented computing technology as described herein may offer an advantage that interaction between individual agent entities is not fixed during code compilation, and compiled agent entities are capable of creating new interactions with other agent entities in an agent community after compilation. Consequently, greater reuse of programming effort may be achieved using agent oriented technology as described in the specific implementation herein, compared to conventional object oriented technologies.

Reuse of programmer effort is further improved by the nature of the interfaces between the agent entities. Agents interacting using an ACL maintain a common, well-defined interface which remains consistent between implementations, both syntactically and semantically. The ACL is domain independent, so it is always possible for agents to interact without requiring programmers to consider the interfaces of the existing agent entities as with traditional object orientation. This ability is supported by the autonomous nature of agents and their ability to co-operate at a peer to peer level.

Figure 4:
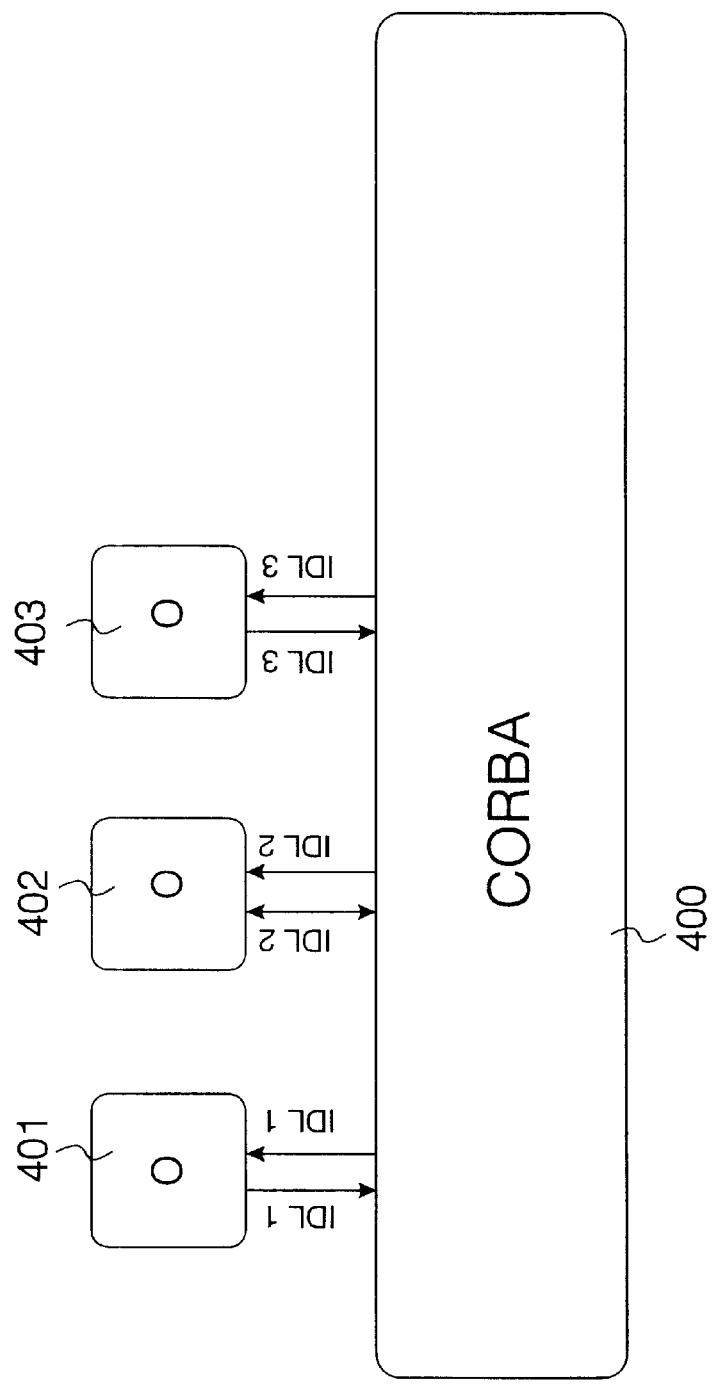
FIG. 4 herein illustrates a prior art common object request broker architecture (CORBA) platform in which a plurality of objects communicate with each other through a range of proprietary interface languages.

Referring to FIG. 4 herein, there is illustrated a prior art use of the known CORBA interface for communicating between a plurality of known individual objects 401–403.

The prior art CORBA architecture supports communication between static distributed objects. Objects may be distributed or implemented in an heterogeneous languages. For example, an object implemented in C++ would reference a distributed object written in Java, the complexities of the heterogeneous languages and the distribution being hidden by the CORBA platform. Method calls between the objects are supported, with technicalities of the object distribution hidden from the objects. As first and second objects existing on different host physical resources can be implemented in different languages, for communication between the objects to occur there is a requirement of the conventional CORBA platform for the different interfaces of the two different objects to be translated to a common language which can be understood by both objects. The CORBA standard prescribes an interface definition language (IDL) for this purpose. The required object interaction is defined at compilation.

However, in general, where a new object is introduced onto the CORBA platform to communicate with other objects, the interface definition language required to interface the object to the CORBA platform is used differently in each case. Each time a program developer wishes to introduce a new object, he or she must deal directly with the interface complexity of the CORBA platform and the heterogenity of IDL interfaces, and is faced with incorporating the new object with the CORBA platform using the interface definition language, eg at compile time or link time. Although a common syntax is defined for the interface definition language, the meanings attached to the syntax are defined by persons creating the objects. Each time a new user creates an object, they are likely to attach different meanings to the syntax, with the result that two objects created by different persons will treat a same syntactic expression as meaning different things. The number of construct variations of the interface definition language is potentially extremely large, and problem specific. The large number of constructs arises due to the large number of ways in which constructs may be used in solving individual problems. In FIG. 4, first object 401 accesses the CORBA platform using a first interpretation of the interface definition language IDL1. Similarly, second object 402 communicates with the CORBA platform using a second interpretation of the interface definition language IDL2. Similarly, for other objects. The information described in the interface definition language is specific to the objects themselves, over which the interface has been defined. The interface definition language itself is subject of an ITU (International Telecommunications Union) standard, however it is used differently for each separate interface type used in different objects.

The CORBA architecture also supports mobility of objects through CORBA services. Objects resident on a host computer at a first location may be copied or transported to a computer resident at a second location. However, to access the CORBA service, it is still necessary to provide an interface definition language for each object using the CORBA platform.

Figure 5:
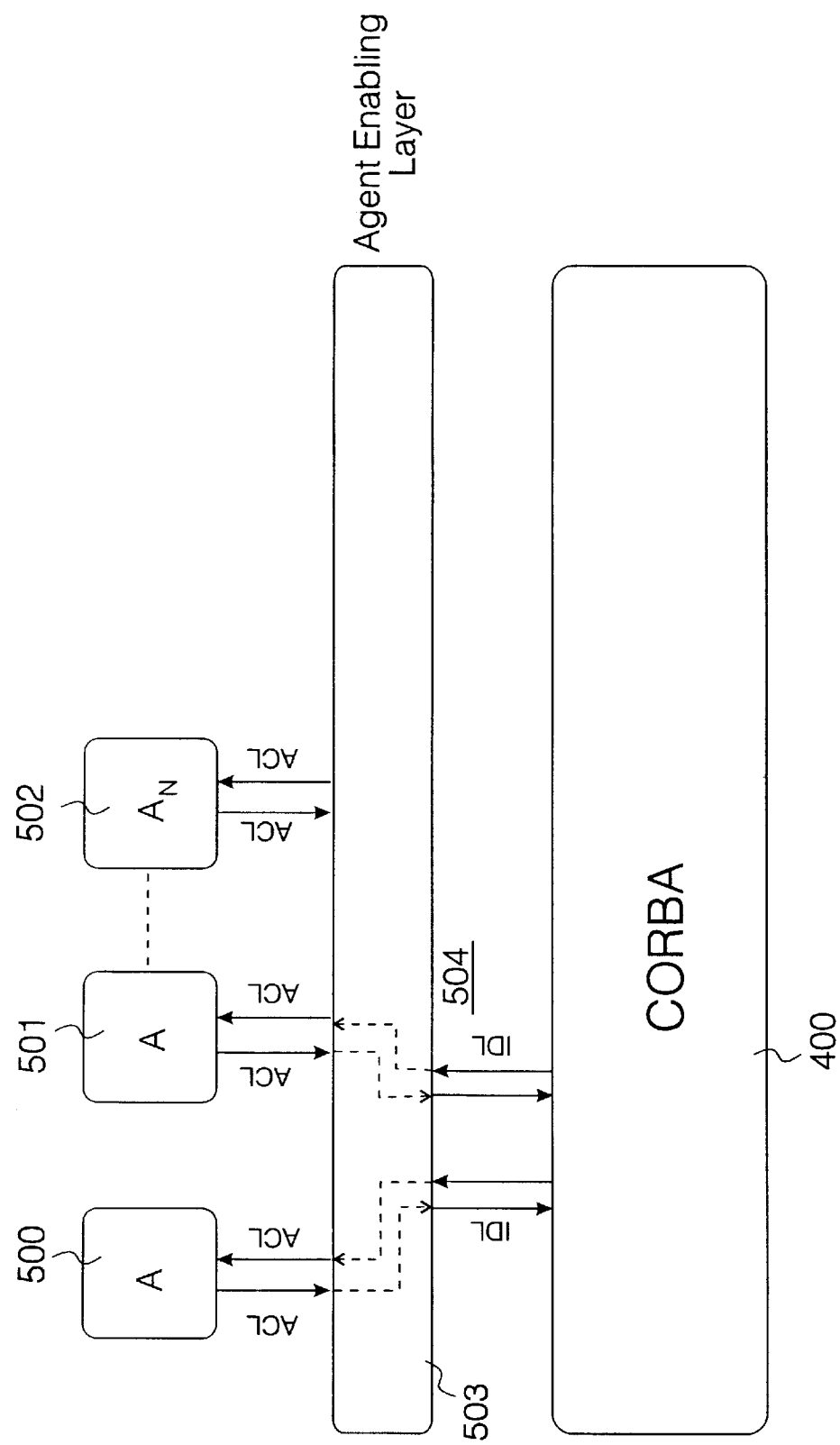
FIG. 5 herein illustrates schematically an architectural view of an agent enabling layer based on a CORBA platform.

According to the specific implementation presented herein, as illustrated in FIG. 5 there is provided an infrastructure for an agent oriented computing environment in which interaction between a community of a plurality of agent computing entities may be enabled using a conventional CORBA platform, by effectively hiding the interface complexity of the CORBA platform from the plurality of agent entities.

Referring to FIG. 5 herein, there is illustrated an architectural overview of an infrastructure for an agent oriented computing environment according to a specific embodiment of the present invention. The infrastructure comprises a plurality of agent shells, 500, 501, 502 each capable of containing an agent computing entity, an agent enabling layer 503 and a CORBA platform 400. Each agent is constructed within an agent shell means and has a basic agent structure as illustrated in FIG. 3 herein. A plurality of agent computing entities residing in shells 500–502 communicate with each other on a peer to peer basis using an agent communication language (ACL) over the agent enabling layer 503. Conceptually, communication occurs directly between agents in the agent communication language as shown by the dotted line in FIG. 5. Physical communication between agents occurs across the CORBA platform 400. In the specific implementation presented herein, the agent communication language used is the prior art Foundation for Intelligent Physical Agents (FIPA) agent communication language. However, in another embodiment the known knowledge query management language (KQML) may be used, although the invention is not limited to these choices of language. The agent enabling layer 503 communicates with an underlying conventional CORBA platform 400 using a well defined interface encoded in the interface definition language (IDL) 504. The interface includes a method for sending and a method for receiving messages. The methods are written in the syntax of the interface definition language. The interface definition language 504 for said methods is written once and is used by all agents in the community, with a result that the agent enabling methods have a same meaning for all agents using the agent enabling layer 503 on a CORBA platform.

Agents may find out about each other using a brokering service provided by the agent enabling layer 503. The agent enabling layer 503 also provides an agent naming service, with which each agent registers. Further, the known FIPA 97 part 1 Agent Management describes the functionalities required for agents to register services and locate agents supporting particular services. The specific implementation described herein discloses a method facilitating implementations of the FIPA 1997 specification.

Physically, the agent oriented computing environment extends geographically over a same area as the agent enabling layer 503 by virtue of the widespread distribution facility provided by the CORBA platform. Logically, each agent connected with the agent enabling layer 503 can find each other connected agent. Agents may log their physical location on registration, as provided by the FIPA 1997 specification, or in other variations, geographical location may be effectively unseen by the agents.

Figure 6:
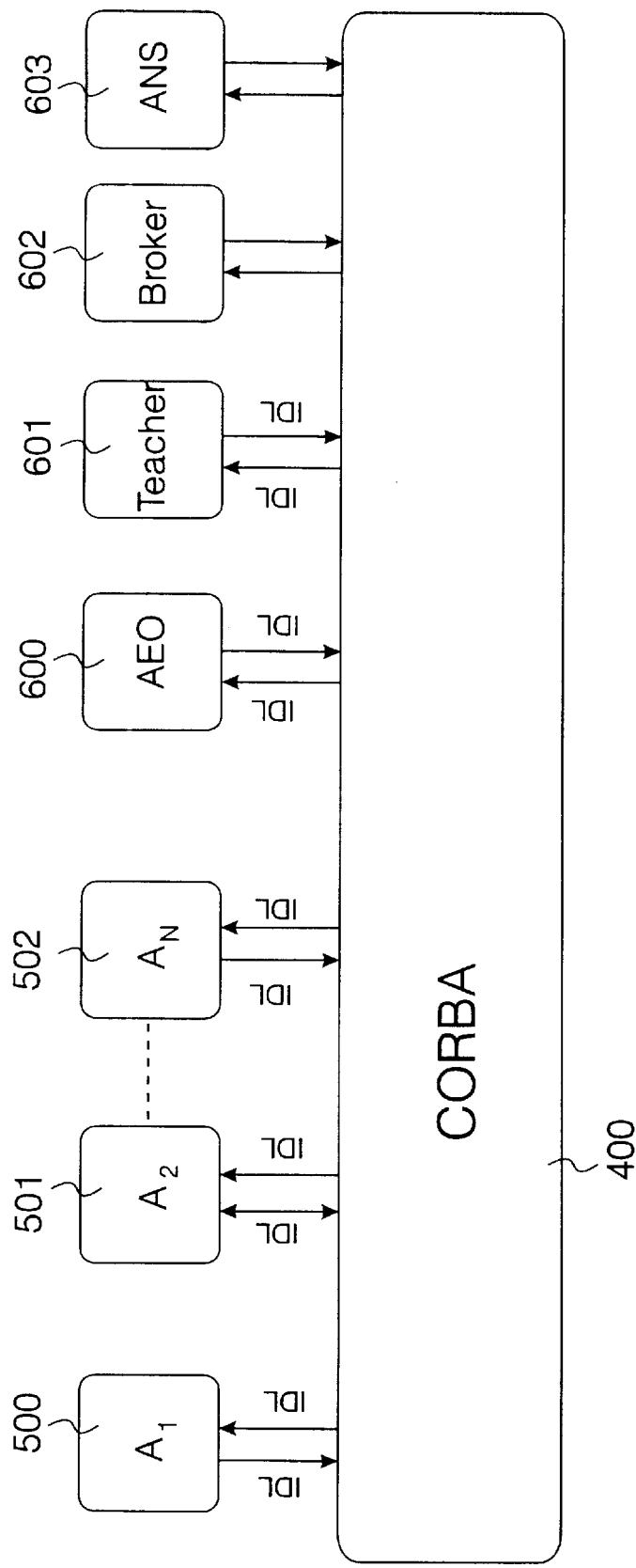
FIG. 6 illustrates schematically an architecture of the agent enabling layer.

Referring to FIG. 6 herein, there is illustrated how the infrastructure of the agent oriented computing environment is practically implemented. The agent enabling layer 503 comprises an agent enabling object 600; a teacher object 601; a broker agent 602; and an agent naming server object 603. The agent enabling object 600, teacher agent 601, broker agent 602 and agent naming object 603 may be distributed physically anywhere across the computing environment, but their logical locations are known to each agent, by virtue of address locations provided as part of a messaging means of the agent template. Each agent shell 500, 501, 502 of the plurality of agents communicates directly with the CORBA platform 400 using the methods made available by the agent shell. The agent shell can be implemented in a range of languages, including ideally, but not exclusively as a Bean in Java; in C++; or SmallTalk. A stub for the main object of an agent is defined in the interface definition language, so that it can be referenced over the distributed CORBA infrastructure by other agents. At each agent, the messaging component of that agent provided for in the agent shell is configured to communicate by exchanging ACL messages with utilization of the facilities provided by the CORBA services which are well documented in the prior art CORBA specification, particularly, but not exclusively, the Names, Events, Externalization, Security, and Trader Services offered by CORBA.

Peer to peer communication between agents using the agent communication language is provided by the agent enabling object 600 comprising the agent enabling layer 503. Whereas the prior art arrangement shown in FIG. 4 herein provides a plurality of objects, with messaging between the objects based on the CORBA platform, and accessed by the interface definition language, with the interface definition language providing a syntax, the agent oriented environment of FIGS. 5 and 6 herein provides a plurality of object sets communicating with each other over a CORBA platform and object set placed within an agent template, where the sets of objects communicate with each other using an agent communication language providing a syntax, a set of semantics, and a protocol. The agent oriented environment infrastructure as illustrated in FIG. 6 herein requires that sets of objects comprising agent entities communicate with each other using an agent communication language which has a well defined set of messages, and communication between agents is made using a single interpretation of the interface definition language. On the other hand, in the prior art object oriented arrangement as illustrated in FIG. 4, individual objects communicate with each other using the known interface definition languages but the number of available constructs to the interface definition language occurring in the objects are unbounded. However, in the present implementation, a single ACL to IDL interface is constructed irrespective of a problem addressed in a communication between agents. Only specifics of the ontologies and the ACL content field change between application domains.

Figure 8:
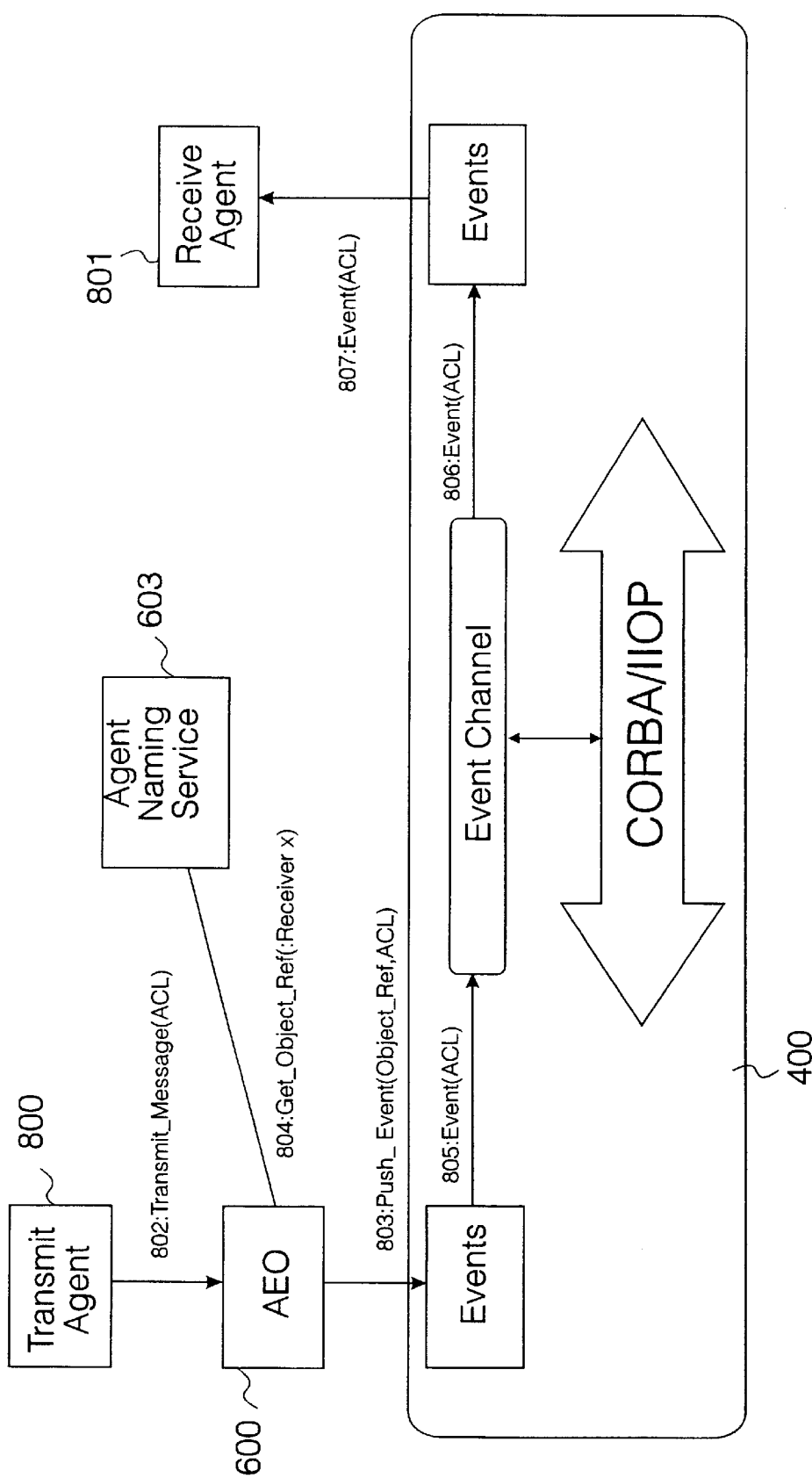
FIG. 8 illustrates schematically communication between a first agent and a second agent over an event channel of a CORBA layer.

The agent enabling object 600 contains data describing syntax, semantics and protocol necessary for implementing communications between agents at a high level. The agent enabling object encapsulates the ACL message in the event (as shown in FIG. 8), selects an appropriate designation of the message, and pushes the message onto the CORBA event channel. The agent enabling object 600 contains code for controlling buffering of ACL messages, determining whether ACL messages have failed, and low level implementation of message handling using the agent communication language. The agent enabling object may be resident on a server computer equipment, or most likely it will be local to the agent itself.

The agent enabling object 600 provides a link to the CORBA platform. An agent makes a request of the agent enabling object 600 to transmit a message. This request is the IDL in FIG. 6 to the CORBA platform. An interface in agent enabling object 600 operates a method for, for example, making a request in the form Transmit Message (ACL Message) defined in the IDL. This method is available for calling by an agent in the community, eg agent 501.

The broker agent 602 provides a central resource to which all agents have access, for matching agents together according to their requirements. The broker agent maintains a register of agents and services offered by those agents, which the broker agent can use upon the request of other agents, to recommend a suitable agent capable of providing services requested by an agent addressing the broker agent.

The agent naming server object 603 comprises a resource to which all agents have access, listing all agents in the community. An agent naming server object may be addressable by said agent communications language, and by said interface definition language, to ensure legacy support. Agents register their names with the agent naming server object to ensure that it can provide mappings between agent names and their associated CORBA object identifiers. This service is employed by the agent enabling object when it is requested to deliver an ACL message.

Thus, a basic infrastructure for supporting the creation and use of a plurality of agent computing entities in an agent oriented environment comprises the agent shell means the agent enabling object 600 providing the basic agent enabling layer messaging interfacing between agents; including specialist agents such as agent naming server object 603; the broker agent 602; and the underlying CORBA platform 400.

An architecture of an agent shell comprising the infrastructure for creating one or more agents 501, 502, 503 as described logically with reference to FIG. 5 herein comprises one or a plurality of application domains, an agent communication language to interface definition language interface for encapsulating ACL messages; an agent communication language object providing a set of ACL message types available as an instruction set of commands which can be used by the one or plurality of user specified applications. The user applications are specified by persons creating the agents and are application specific, and although forming part of the agent itself, do not form part of the agent enabling infrastructure. The applications each comprise code and data arranged as sets of objects. The applications may include legacy applications which are encapsulated in an agent via an application specific stub defined in IIOL. Configuration and functionality of the applications gives the agents their individual characteristics of "intelligence" and "human factor" and is left as a programming option to individual users. For example, individual users may create objects using prior art genetic algorithm packages or other artificial intelligence packages which are integrated with the agent via either mature methods, or with IIOL stub definitions. Alternatively users may create their own custom applications which use the functionality of the agent shell. In one implementation, the agent shell may be produced as a base class which may be inherited, and then refined or restricted to use as an agent forming part of a new application for a user. New agents extend from the shell. The set of objects 301 referred to in FIG. 3 herein are implicit in the user defined applications, which may model real world systems and problems. As far as the person creating agents is concerned, the person is provided with a package comprising the shell means which includes the basic agent communication language messaging capability. The person may then implement his or her own agent, in whatever language they choose, eg Java, C++, SmallTalk, Prolog. These agents can congregate to form user specified applications (see FIG. 2 herein).

Figure 7:
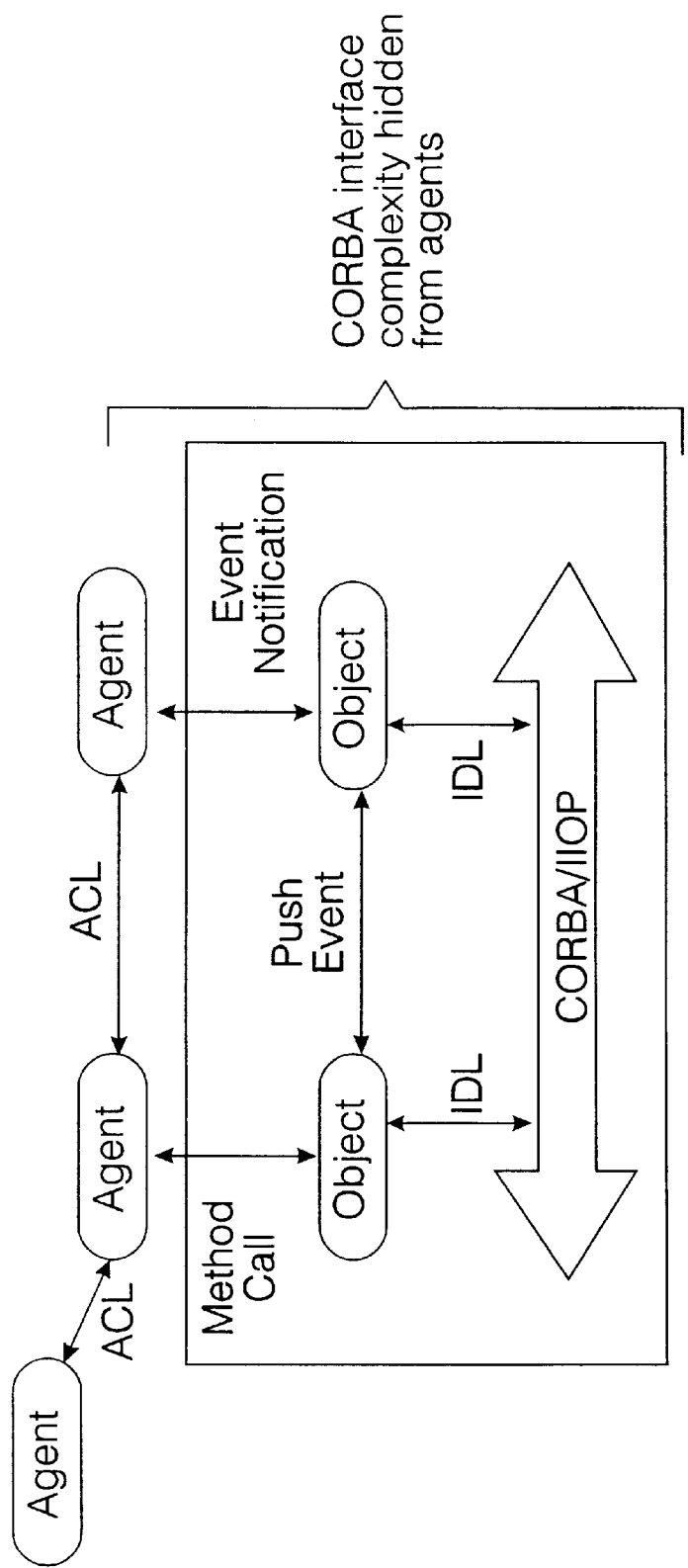
FIG. 7 illustrates schematically access to a CORBA object from an agent environment via a proxy agent.

Referring to FIG. 7 herein, there is illustrated an architecture for evolvable self-configuring components. A plurality of agents communicate in ACL using a CORBA/IIOP platform.

Referring to FIG. 8 herein, there is illustrated schematically how communication between first and second agents 800, 801 is achieved over an event channel of the CORBA layer 400. This models the agent communication service offered by the agent enabling object. The CORBA event channel conceptually links the two agents together, whether they reside on the same or different platforms. The CORBA platform is used as an asynchronous communication means. The contents (ie the parameter) of the Event is an ACL message. The form of the Event is defined in IDL. Objects and agents may push events onto the CORBA event channel and the events may be pushed onto an object or agent by the event channel, or events can be pulled off the event channel by an object or agent. In step 802, the first agent 800, transmitting an ACL message, pushes a message onto the event channel which connects to the second agent 801. If the first agent 800 wishes to push a new message onto the event channel destined to the second agent, when it is not possible to directly push the message onto the second agent, messages are queued in the CORBA event channel.

A mapping between agent names and an object unique identifier is achieved via the agent naming service object 603 in step 803. All agents must register their names with the agent naming service object 603 before they can interact with any other agent. The CORBA names service supports an ability to generate unique names for agent entities. Cross referencing between agent entity names is supported by the names service. The CORBA names service provides functionality for accessing the physical resources supporting the agent computing entity at its physical location. All agent communication language messages are exchanged between agents as flat byte streams. A single method is available to agents for requesting that a message is sent, this being a Transmit Message. All messages arrive at an agent as an event notification 807 with the agent communication language stream passed as a parameter in the event channel.

The agent enabling object 600 contains a number of methods which are defined in that object. One of those methods is a Transmit method. This provides a single, well defined method for agents to exchange ACL messages over CORBA, used here as an underlying message transport medium. Conceptually, the agent enabling object 600 can be considered as providing a transition from the agent communication language into the Interface Description Language and to the underlying CORBA platform 400.

In step 803, agent enabling object 600 invokes a request to push an event, giving two parameters, including firstly a CORBA definition of a destination of the event obtained in step 804, and the other parameter being an ACL message included verbatim. The ACL message is encapsulated in an Event 805 on the event channel of the CORBA platform The Event itself is written in IDL, but a parameter of the Event is an ACL message. The Event is pushed onto the reference object, i.e. Receive Agent 801 in step 807. The Receive Agent recovers the encapsulated ACL message from the Event, and acts on the ACL message.

Figure 9:
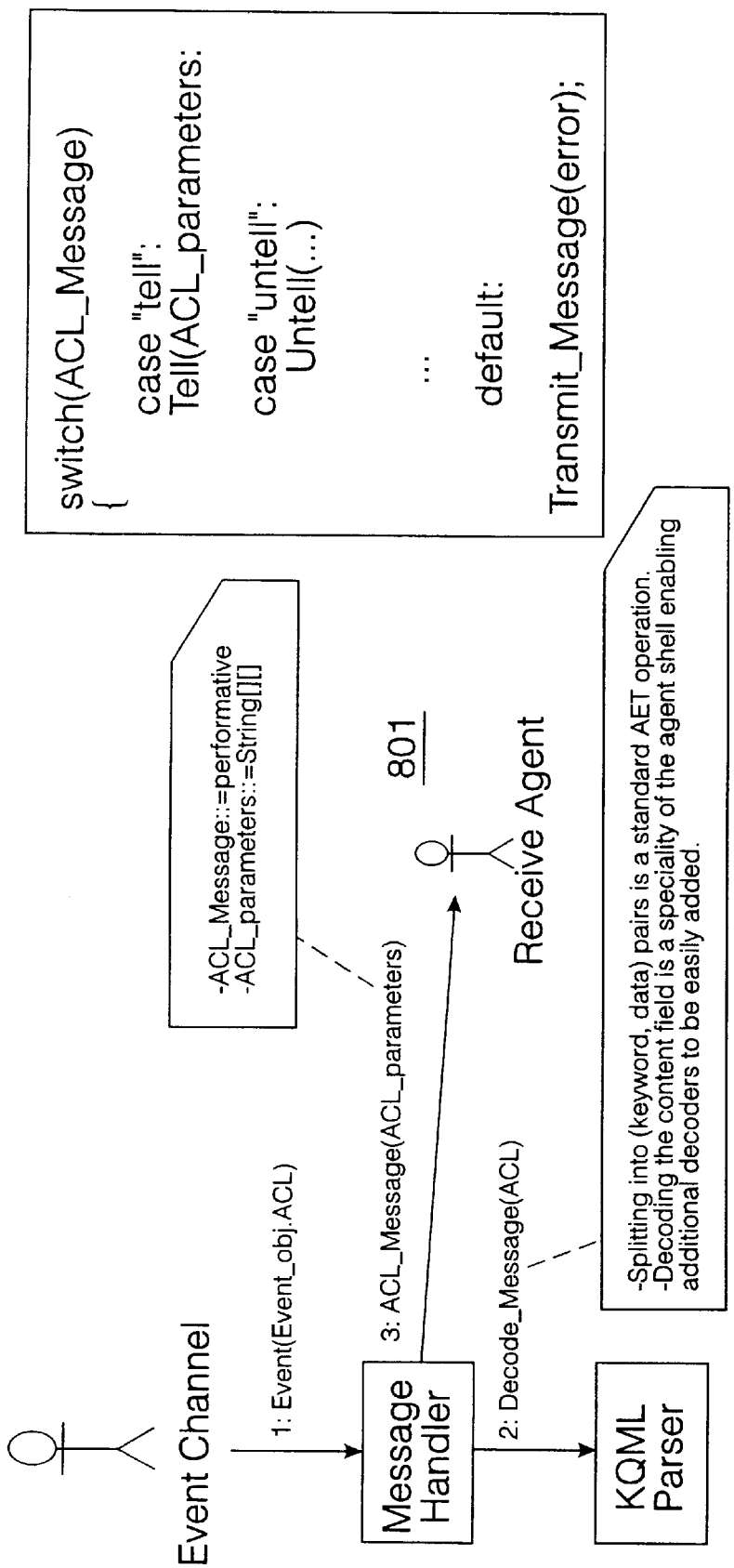
FIG. 9 illustrates schematically reception of an event message by the second agent identified in FIG. 8.

Referring to FIG. 9 herein, there is illustrated schematically an overview reception of an event message by the second agent 801 of FIG. 8 according to a specific method of the present invention. The human figures in FIG. 9 represent external interactors to the system. CORBA handles the propagation of the event between the agents. Second agent 801 receives an event object from the CORBA event channel, which encapsulates the agent communication language (eg FIPA ACL or KQML) message. The agent enabling object 600 automatically extracts the ACL message from the event object and is pushed through an ACL parser, decoding the message into a list of keyword and data tuples. A performative is used to determine which method the second agent should call in order to process the received message. A remaining keyword, data tuples are passed as parameters to the called method. The use of two dimensional arrays allows for variable numbers of parameters to be included in an ACL message. The second agent 801 needs to be configured only to inherit and redefine the particular methods which relate to the performatives with which it is concerned. The domain specific agent shell provides default implementation for dealing with the performatives. Default implementations are given for all messages, including for example default messages notifying to another agent that a received message has not been understood. Thus, only some messages need to be defined in an agent to agent interaction. Messages received by a receiving agent are automatically handled, but a sending agent may be notified that a receiving agent does not understand the message.

The syntax of the content field of the ACL message is not restricted, as the message form enables the agent sending the message to declare the specific syntax used. There is however a requirement on the receiving agent to be able to interpret the chosen form should it not be supported directly by the "agent shell" described herein. The Knowledge Interchange Format (KIF) [Knowledge Interchange Format: Version 3.0 Reference Manual, Michael R Genersereth et al, June 1992, Computer Science Department, Stanford University, Stanford, Calif., 94305, USA] may be suitable for knowledge based type messages, similarly a language specific choice (eg Prolog) may be deemed appropriate. Other alternatives include SL as defined in the FIPA 1997 standard [CORBA Services: Common Object Services Specification, July 1997, available from the Object Management Group Inc., Frammingham Corporate Center, 492 Old Connecticut Path, Frammingham, Mass. 01701, USA], XML as defined by WC3, or IDL as defined by the OMG (recommended for procedural type requests). Further alternative supporting agent mobility include byte code, for example Java or the CORBA Externalization Service data stream.

Figure 10:
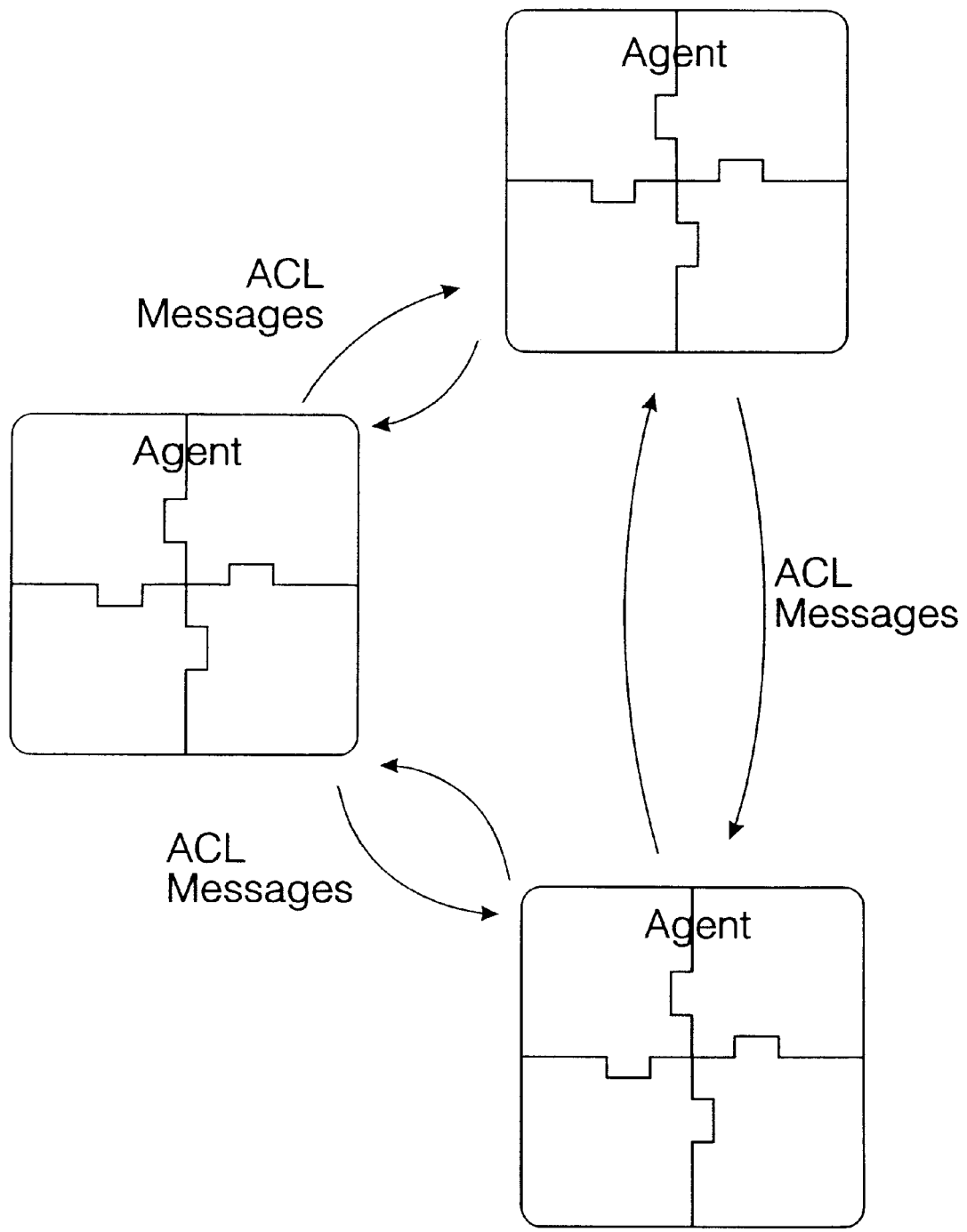
FIG. 10 illustrates a logical view of a plurality of agent entities comprising a community of agents, communicating with each other in an agent communication language (ACL)

Referring to FIG. 10 herein, there is illustrated a logical view of a plurality of agent entities comprising a community of agents, communicating with each other via an agent communicating language (ACL). Typically, such agents will communicate with each other using ACL messages on a direct peer to peer basis with no restrictions imposed by the physical location and implementation details.

The agent communications language used is based on speech act theory and separates a domain dependent part of a communication (the content of the communication) from a domain independent part of the communication (a messaging package used to transport the contents). Speech act theory stems from prior art attempts to understand human language, and incorporates an idea that with language, not only are statements made, but actions are also performed [J L Austin "How To Do Things With Words" Clarendon Press, Oxford, UK 1962]. A stylized syntactic form for speech acts that begin "I request . . . " or "I declare . . . " is called a performative. With a performative, literally saying something defines that something.

The agent communication language defines what is considered to be a minimal set of performatives necessary for communication between agents. For comparison, in the English language, there are several hundred verbs which correspond to performatives. However, in the agent communication language supported by the agent enabling object 600, a restricted but complete set of performatives are supported, which all agents can use. Each agent in the community is configured to be able to use specific performatives supported in the agent enabling object 600. The performatives available for use by any particular agent are left as a option within the agent shell illustrated with reference to FIG. 3 herein and are user specified by persons creating the agents. However, a restriction is placed on the user of the performatives, such that the semantics described for a given performative must be adhered to. That is to say, when configuring the agent entities, all agents must use a particular selected performative to have a same meaning. Thus, when agents interact with each other, a first agent, which requests a service from a second agent, using an ACL performative, is provided with a response by the second agent which has taken account of the same information described by the performative.

Figure 11:
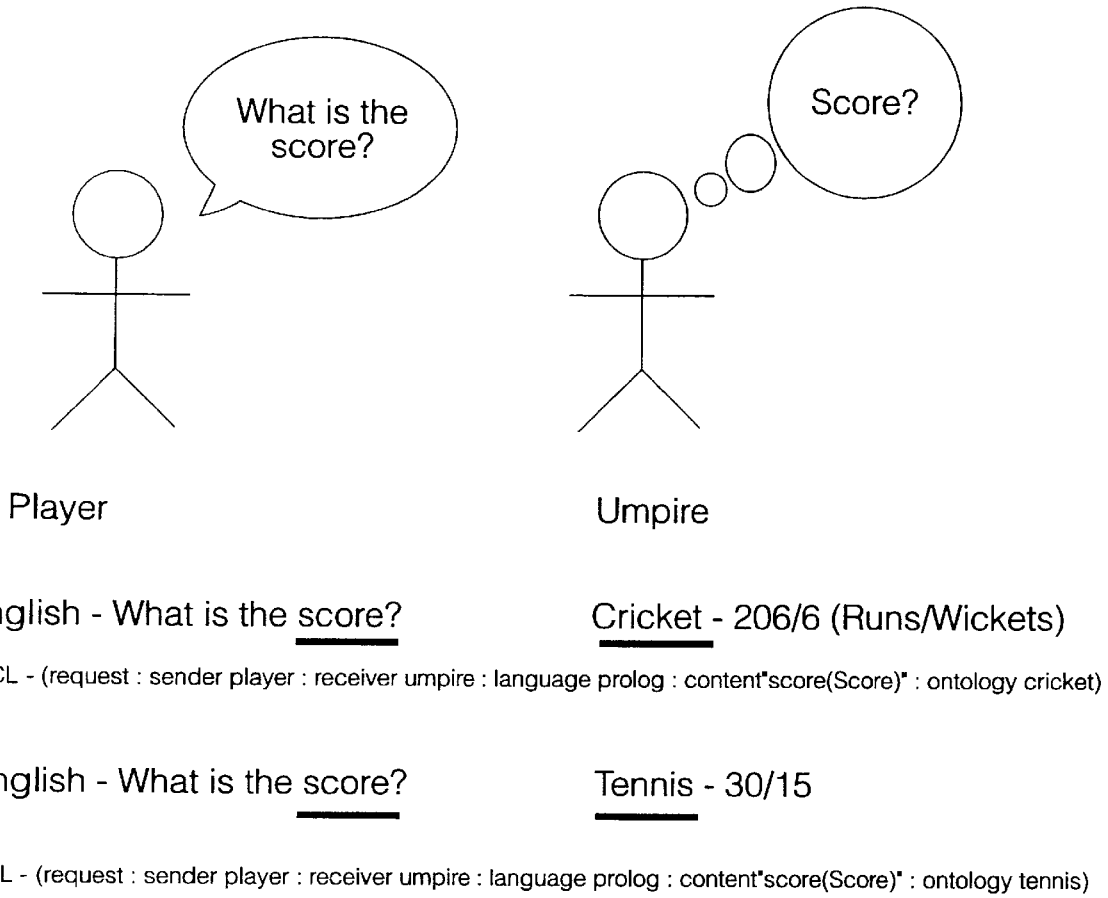
FIG. 11 illustrates schematically an example of agent communication language messaging, in particular an example of ontologies.

Referring to FIG. 11 herein, there is illustrated schematically an example of agent communication language messaging. The agent communication language enables a first agent to form a sentence structure. In this example, a basic sentence structure is that for a "what is . . . " type of question. The details of the question in this case "the score" is encoded in a content component of an ACL message. A syntax used for encoding the question details is specified in an ACL message structure as a language component. A context in which a question has been asked is relevant. Taking an analogy of a player and an umpire talking to each other, being analogous to first and second agents communicating with each other using an ACL, if the player was to ask the question "what is the score" when playing cricket, the umpire's answer may be constructed differently than if the same answer were to be posed in the context of a tennis match. This problem is addressed by ACL, with the inclusion of an ontology component. The ontology component draws the attention of the receiving agent to an appropriate vocabulary which is described in a referenced ontology for a specific context and by ensuring both parties share a common understanding of terms used in the context of the message, ensures that the required interaction can be achieved.

The format of content in an agent communication language message as illustrated in FIG. 11 is left unspecified by the agent communication language itself, ensuring that information communicated between agents is not restricted by the format of the messages which they send.

An ontology comprises an explicit specification of a conceptualization: in simple terms a vocabulary. The term "ontology" is borrowed from philosophy where an ontology is a systematic account of existence. For artificial intelligence systems what "exists" is that which can be represented. When the knowledge of a domain is represented in a declarative formalism, the set of objects that can be represented is called the universe of discourse. This set of objects and the describable relationships amongst them are reflected in a representational vocabulary with which a knowledge based program represents knowledge. Thus, in the context of artificial intelligence, an ontology of a program can be described by defining a set of representational terms. In such an ontology, definitions associate the name of entities in the universe of discourse (eg classes, relations, functions or other objects) with human readable text describing what the names mean, and formal axioms which constrain the interpretation and well formed use of these terms. Formally, an ontology is the statement of a logical theory.

In the present implementation, common ontologies are used to describe ontological commitments for a set of agents so that they can communicate about a domain of discourse without necessary operating on a globally shared theory. A common ontology defines a vocabulary with which queries and assertions are exchanged amongst agents. Ontological commitments are agreements to use the shared vocabulary in a coherent and consistent manner. The agents sharing a vocabulary need not share a knowledge base; each knows things the other does not and an agent that commits to an ontology is not required to answer all queries which can be formulated in the shared vocabulary.

Ontologies are utilized for enabling knowledge level interpretation of agents. Meaningful interaction between agents occurs if they share a common interpretation of a vocabulary used in the agent communication language forming their communications. Ensuring that agents use a common ontology provides consistency but not completeness with respect to queries and assertions using the vocabulary defined in the ontology. An example of a database suitable for providing an ontology in the agent enabling object is the known Ontolingua server [Adam Farquahar, Richard Fikes and James Rice "The Ontolingua Server. A Tool for Collaborative Ontology Construction" Knowledge Systems Laboratory, Stanford University, USA].

Within the agent oriented computing environment, agents may perform the following functions:

agents within the community are able to find each other and establish what functionality and services are provided by other agents in the community, in terms that each agent is capable of understanding.

agents interact with each other by forming contracts with each other, which each agent understands according to a common ontology shared by both agents.

agents may be physically transportable as between different physical resources, or can remain static on their host physical resource(s), whilst still interacting with other agents.

legacy databases, objects and applications may be introduced into the agent environment.

Figure 12:
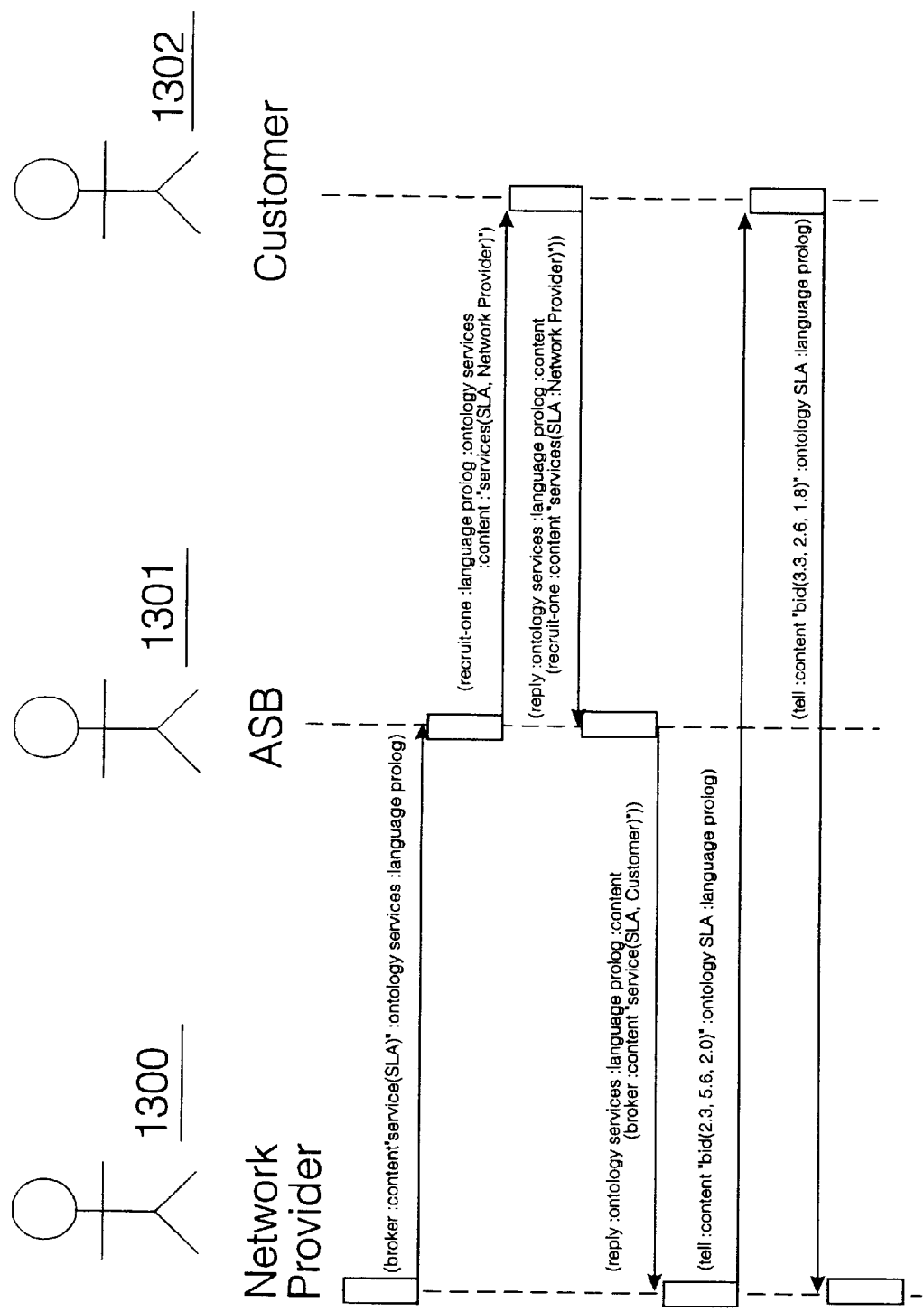
FIG. 12 illustrates an example of a broker operation provided by an agent service broker agent.

Referring to FIG. 12 herein, there is illustrated an example of a broker operation provided by agent service broker agent 602. The agent service broker performs the function of bringing together agents within the agent community. A newly created agent registers a service which it offers with the agent service broker 602. The agent service broker then utilizes its knowledge of available agents to fulfill requests received from other agents, which occur dynamically at run time.

The agent service broker comprises an intelligence component, which combined with intelligence components of other agents ensures that appropriate agents are assigned to any received requests from agents. A role of the agent service broker extends to ensuring that particular agents do not become overloaded with requests for services from other agents, when there are similar agents offering a same or similar service which are under-used.

Figure 13:
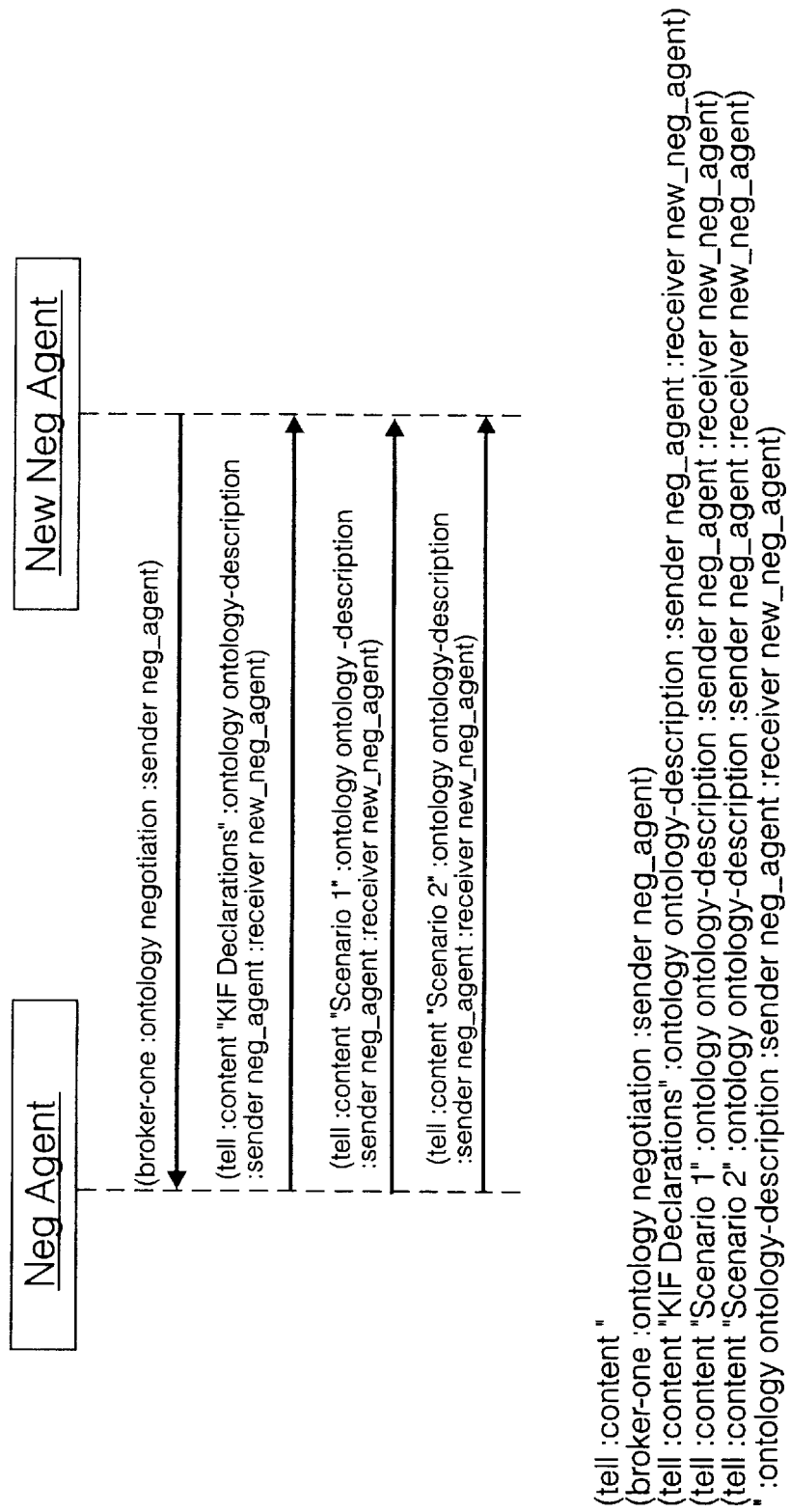
FIG. 13 illustrates a network provider agent having available telecommunications services which it wants to provide to customers.

In the example of FIG. 13, a network provider agent 1300 has available telecommunications services which it may provide to customers. The network provider agent 1300 utilizes the agent service broker 1301 to recruit a customer agent 1302 to which it can form a contract for sale of telecommunications services. The network provider agent 1300 indicates to the agent service broker 1301 that it requires an agent which can perform a service level agreement (SLA), so that they can negotiate a contract. The agent service broker selects an appropriate customer agent 1302 from a plurality of possible customer agents and attempts to recruit that selected agent on behalf of the requesting network provider agent 1300. When the recruited customer agent 1302 accepts recruitment, it is put directly into contact with the requesting network provider agent 1300 enabling a direct communication between network provider agent 1300 and customer agent 1302 with no further involvement from the agent service broker 1301.

A series of agent communication language signals between the network provider agent, agent service broker agent 1301 and customer agent 1302 are illustrated schematically in FIG. 13. In step 1303, the network provider agent 1300 sends an agent communication language message containing information about the services (the service level agreement) and an ontology describing the services to the agent service broker 1301. The agent service broker interprets the service level agreement data and ontology, so that an intelligence component of the agent service broker 1301 acquires "knowledge" describing the required services. The agent service broker agent 1301 applies selection criteria for selecting agents from a list of registered agents registered at the agenst naming service object 603, and then having selected an agent attempts to recruit that agent by issuing a recruit message in the agent communication language to that selected agent. A recruit message contains the ontology describing services, information describing the available services (service level agreement) and details concerning the network provider agent (eg a company operating the services). The selected customer agent 1302 replies to the agent service broker using a reply message in the agent communication language. The reply message contains information describing the customer agent and is sent to the agent service broker 1301. The agent service broker forwards the reply message to the network provider agent 1300. On receipt of the reply message, the network provider agent 1300 enters into a direct communication with the customer, having received details of the customers identification in the reply message, and enters into a bid/offer negotiation directly with the customer agent 1302 using a common ontology in the agent communication language.

Referring to FIG. 13 herein, there is illustrated steps for service introduction and creation of an interaction between agents according to a specific method of the present invention implemented as a teacher agent. Agents within the community need to be able to determine what services and functions other agents within the community can provide. As the basic constructs for communication between agents are well defined, agents need only to determine how they intend to use those constructs to achieve their goals. This is done by means of creating service contracts between individual agents. When designing an agent, a planned interaction of an agent can be captured in terms of a use case scenario. The use case scenario interaction requirement can then be translated to form guarantees and pledges which two agents can use to advertise to each other how each agent works. A contract of an agent describes to other agents within the community how that agent will perform its offered function or service. The guarantees/pledges contract of one agent can then be used by other agents which require a service to determine the information they need to send to the agent providing the service, for the service to be achieved. The contracts form a mechanism for ensuring that only agreed interactions between agents can be achieved.

Common ontologies are promoted as a method of ensuring that agents can talk on a common level with each other as and when required. Basic speech acts remain constant from domain to domain, but possible problem domains in an agent system will to involve semantics and syntax. Problem domains can be described as ontologies. Knowledge of these ontologies can then be used dynamically by agents when required.

Agent mobility may be required by agents having a requirement to complete a procedural task at a remote location. Where a procedural task requires a high messaging, it may be more efficient to transport an agent to a different host device, where it may be able to perform data processing locally, than to address a static agent remotely by messaging through the agent communication language. Thus, in the specific implementation herein, an option of agent mobility or static agents is included. Agents may be transported as between host devices by packaging up agents within the agent communication language and transporting them.

Figure 14:
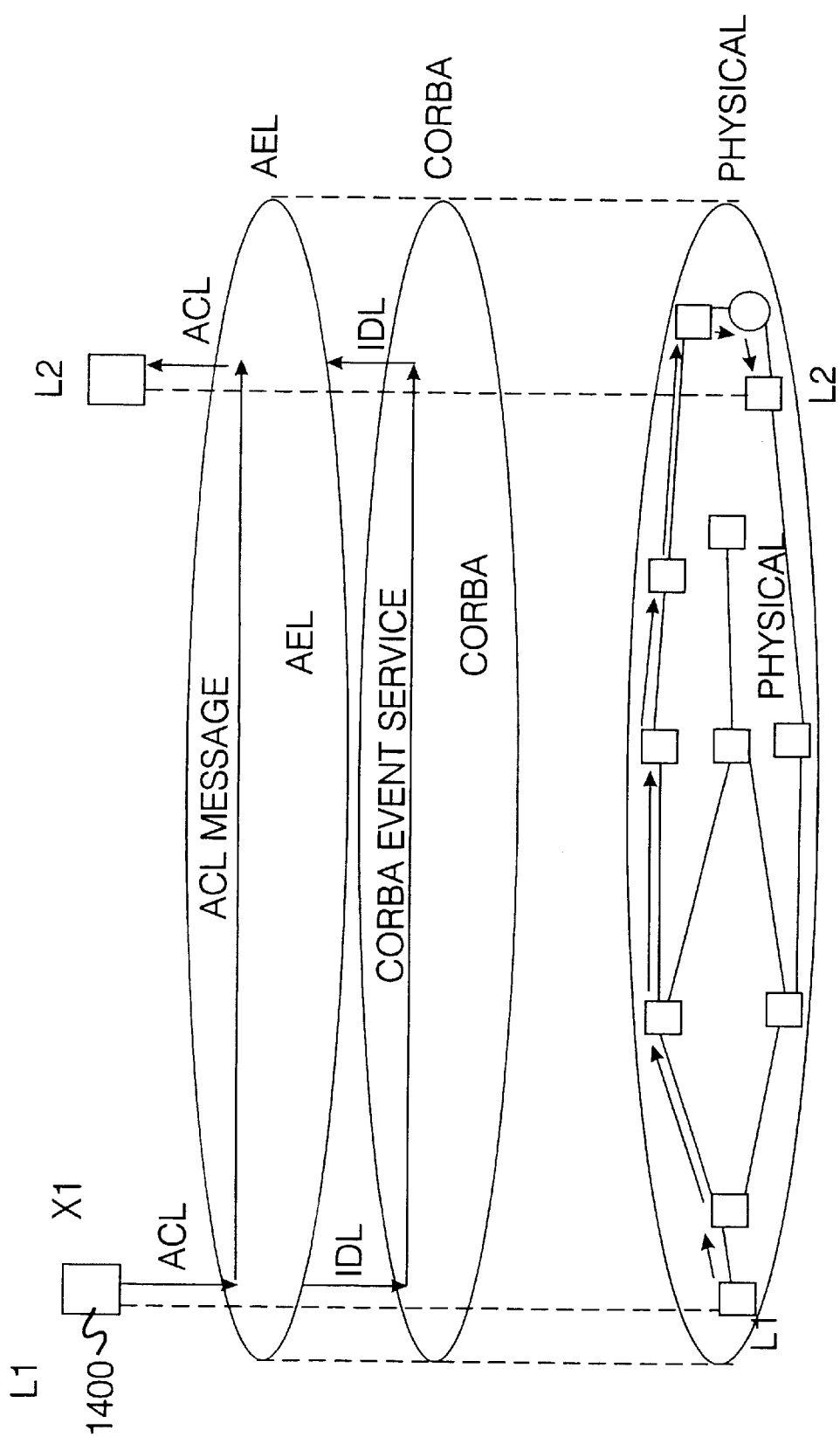
FIG. 14 illustrates schematically an example of how agent mobility is achieved using the agent enabling infrastructure according to the specific implementation of the present invention.

Referring to FIG. 14 herein, there is illustrated schematically an example of how agent mobility is achieved using the agent enabling infrastructure according to the specific implementation of the present invention. Attributes of the agent communication language are specified (ie language and ontology) to enable agents to interpret the contents of messages received. Within the agent community, agent mobility is provided by virtue of the agent communication language. A content of an agent communication language message is not restricted in format, so it is possible to transmit binary files or byte code between agents. The byte code sent in a message may include byte code of an agent itself. The agent enabling layer utilizes the CORBA Externalization service to record object and object states (ie an agent) as a stream of data. This stream of data can then be sent in a content component of an ACL transmission. The externalization service is also employed to internalize a stream to an object so that it can continue execution on a remote host. A first agent 1401 at location L1 on one or more first physical resources may be transported to a second location L2 on a second physical resource by packaging up the code comprising the agent and its state into the content parameter of an ACL message string which is then encapsulated in the interface definition language for transport over the CORBA platform to the second location L2. Transport is achieved as described by the agent enabling layer hereinabove. Sending of the agent is a special case of sending an ACL message. Byte code describing the agent is sent in the content field of the ACL message. The ontology and general form of the content of the message specifies that an agent is contained in the message field. Parameters within the ACL message specify how the content field is to be decoded by the receiving agent at location L2. The CORBA platform provides an externalization service, which provides for taking one or more objects and converting these into a byte stream which is suitable for the content field of an ACL message. The CORBA platform also provides a service for reconstructing the byte stream back into an object resident in a receiving physical entity. On reaching the second location L2, the code comprising the agent is recovered from the CORBA service by extracting the ACL message from the interface definition language, and recovering the content from the ACL message. In order for the transported agent to be received at destination location L2, the byte code describing the agent is received by a receiving agent at location L2. The agent code, carried by the content parameter is stored locally at the physical resource at location L2, so that the agent can operate at physical location L2. Physically, the agent is either transferred or copied from location L1 to L2 or deleted. However, logically, the agent remains within the agent community, or duplicates itself within the agent community. Where agents are duplicated, the newly created agent is assigned a separate name to ensure the uniqueness properties of agent names remains.

Figure 15:
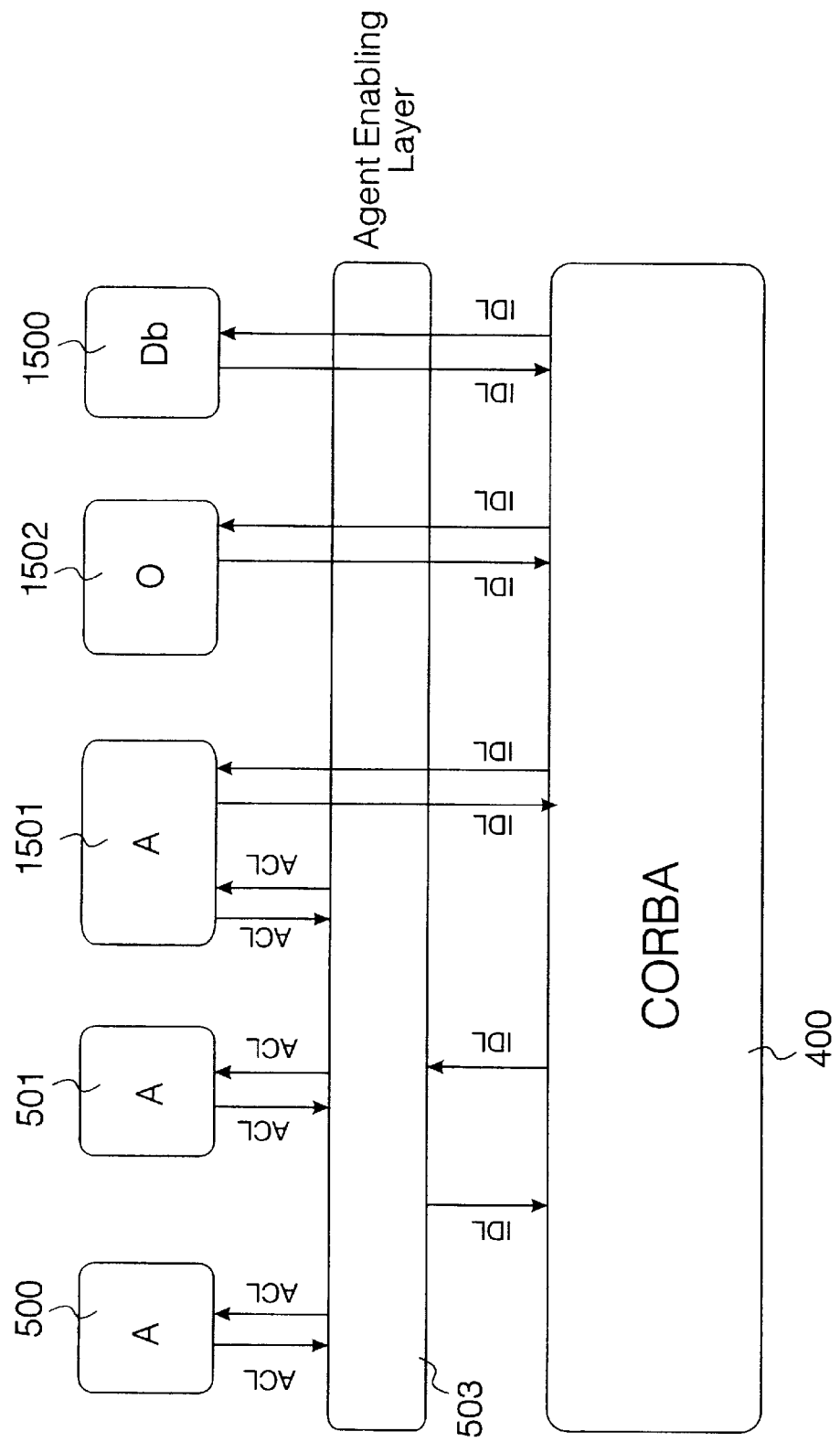
FIG. 15 illustrates schematically an example of incorporation of a legacy database object into agent oriented computing environment.

Referring to FIG. 15 herein, there is illustrated schematically an example of incorporation of a legacy database object 1500 into the agent oriented computing environment. For example a legacy database object 1500 may exist, already interfaced to CORBA platform 400 by the interface definition language (IDL).

Where a user wishes to create a new agent 501 which refers to legacy database object 1500, the user programs his or her application(s) into an agent shell, which communicates across the agent enabling layer 503 using the ACL language facilities provided in the agent shell means. The newly created agent 501 is capable of communicating with all other agents in the agent community, by virtue of the infrastructure provided by the agent enabling layer and underlying CORBA platform 400. However, the database object 1500, not being part of the agent community is inaccessible by newly created agent 501. To introduce the legacy database object 1500 into the agent community, a user creates a "bilingual" agent 1501 which effectively forms an interface between the legacy object 1500 and the agent computing environment such that the legacy database object 1500 is accessible to the agent community. The bilingual agent 1501 is constructed using the agent template means as described hereinbefore, which provides access to the agent enabling layer 503 by use of the agent communication language common to all agents. A user configures the agent to create the bilingual agent by creating a link between the bilingual agent and the CORBA platform using the legacy interface description language IDL as construed specific to the legacy database object 1500. Thus, the bilingual agent provides a translation service between the legacy construed interface definition language IDL, and the agent communication language. In order to configure the bilingual agent, the implementor must have prior knowledge, ie access to data describing the semantics which apply to the legacy interface definition language IDL. However, once the bilingual agent 1501 is created, the legacy database object 1500 is accessible not only by newly created agent 501, but by all other agents within the community. Each agent communicates with the legacy database using the agent communication language ACL via the bilingual agent 1502. ACL messages received by the bilingual agent 1501 are interpreted in accordance with the implementation specific mapping between the ACL understood by the agent—defined by the legacy database and the interface description language. The bilingual agent obtains necessary data specified by the ACL messages from the database object 1500, by communicating with it using the IDL definition of the legacy interface to retrieve data. The bilingual agent then responds to the requesting agent 501 returning the required data carried in ACL message, according to the agreed ontology. Similarly, the bilingual agent 1501 can communicate with other legacy objects 1502 which interpret the IDL in the same way as legacy database 1500. Conceptually, the bilingual agent 1501 may act as a manager for the legacy database 1500 and other legacy objects 1502, for communicating with the community of agents 500, 501. The bilingual agent 1501 provides encapsulation of legacy code and provides a new agent interface, in ACL.

We claim:

1. A communications network providing a distributed computing environment and comprising:
   a plurality of physical resources comprising a plurality of processors, and a plurality of memory means associated with the physical resources;
   a plurality of agent computing entities, each incorporating a set of one or more objects and a messaging component, and residing, the physical resources;
   a means for communicating between the physical resources; and
   means for interfacing the agent computing entities to the communicating means such that the agent computing entities are able to communicate with each other over said communications network using a common set of syntax and common set of message exchanges.

2. The network as claimed in claim 1, wherein said communicating means comprises a CORBA (Common Object Request Broker Architecture) platform.

3. The network as claimed in claim 1, wherein said interface means comprises means for interfacing an agent computing entity representation to said communicating means.

4. The network as claimed in claim 1, wherein said interface means comprises an agent communication language.

5. The network as claimed in claim 1, wherein said interface means comprises a Foundation for Intelligent Physical Agents (FIPA) agent communication language.

6. The network as claimed in claim 1, wherein said interface means comprises KQML (Knowledge Query and Manipulation Language).

7. The network as claimed in claim 1, wherein a said agent computing entity is configured to perform a predetermined task autonomously of other ones of said plurality of agent computing entities.

8. The network as claimed in claim 1, wherein a said agent computing entity comprises an intelligence component.

9. The network as claimed in claim 1, wherein a said agent computing entity comprises a human factor component.

10. The network as claimed in claim 1, wherein a said agent computing entity comprises an object oriented representation of a system.

11. The network as claimed in claim 1, wherein a said agent computing entity is adapted to cooperate with at least one other of said agent computing entities.

12. The network as claimed in claim 1, wherein a said agent computing entity is configured to receive details of functionality provided by another said agent computing entity over said communicating means.

13. The network as claimed in claim 1, wherein a first said agent computing entity corresponds with a second said agent computing entity via a third said agent computing entity, said third agent computing entity configured to perform a teach functionality in which said third agent computing entity communicates an ontology data between said first and second agent computing entities.

14. A computing infrastructure means for supporting a population of agent computing entities in a distributed computing environment, each agent computing entity incorporating a set of one or more objects and a messaging component, said infrastructure comprising:
   a communications platform supporting communications between the agent computing entities;

a shell means for said agent computing entity, said shell means comprising:

an agent communications language element; and an interface means for interfacing between said agent communications language element and said communications platform, wherein the agent computing entities are able to communicate with each other using a common set of syntax and a common set of message exchanges.

15. The computing infrastructure means as claimed in claim 14, wherein said communications platform comprises a CORBA (Common Object Request Broker Architecture) platform.

16. The computing infrastructure means as claimed in claim 14, wherein said agent communication language comprises a Foundation for Intelligent Physical Agents (FIPA) agent communication language.

17. The computing infrastructure means as claimed in claim 14, wherein said agent communication language comprises a KQML (Knowledge Query and Manipulation Language).

18. The computing infrastructure means as claimed in claim 14, wherein said interface means comprises an object capable of encapsulation of agent communication language messages in an interface description language.

19. The computing infrastructure as claimed in claim 14, further comprising a broker agent arranged for introducing a plurality of said agents within said computing infrastructure.

20. The computing infrastructure as claimed in claim 14, further comprising a physical resource configured as an agent naming service, said agent naming service containing data signals describing locations of a plurality of agent computing entities connected with said computing infrastructure.

21. A distributed computing environment comprising a plurality of physical resources configured as a plurality of agent computing entities each incorporating a set of one or more objects and a messaging component, each said physical resource comprising:

at least one data processor;

at least one memory means capable of storing data signals;

a set of control instructions configured for controlling said at least one processor to perform data processing operations on said stored data signals; and a communications platform;

wherein the agent computing entities each comprise a means for interfacing with said communications platform and one or more object representations of a modelled system wherein the agent computing entities are able to communicate with each other using a common set of syntax and a common set of message exchanges.

22. The distributed computing environment as claimed in claim 21, wherein said communications platform comprises a CORBA (common object request broker architecture) platform.

23. The distributed computing environment as claimed in claim 21, wherein said interface means comprises an agent communications language.

24. The distributed computing environment as claimed in claim 21, wherein at least some physical resources incorporate negotiation means, intelligence means and persistent storage means.

25. In a computing environment comprising a plurality of distributed physical resources, each physical resource comprising a processing means, a data storage means, and a control signal storage means; a method of transporting an agent computing entity incorporating a set of one or more objects and a messaging component between a first physical resource at a first location, and a second physical resource at a second location, said method comprising the steps of:

representing said agent entity as a message in an agent communications language;

transporting said message over a CORBA platform between said first and second locations; and converting said message back to code representing said agent computing entity, wherein agent computing entities are able to communicate with each other using a common set of syntax and a common set of message exchanges.

26. In a computing environment comprising a plurality of distributed physical resources, each said physical resource comprising a processor means, and a data storage means, wherein a plurality of agent computing entities each incorporating a set of one or more objects and a messaging component are resident on said plurality of said physical resources; a method of data processing comprising:

interacting a first agent computing entity with a second agent computing entity by:

i) said first agent computing entity packaging a set of data signals into one or more agent communication language messages;

ii) transporting said one or more agent communication language messages to said second computing entity over a CORBA platform; and iii) said second computing entity receiving said one or more agent communication language messages and recovering said data signals therefrom wherein said first and second agent computing entities are enabled to communicate with each other using a common set of syntax and a common set of message exchanges.

27. The method as claimed in claim 26, wherein said step of transporting said data over said CORBA platform comprises containing said messages of said agent communication language into an interface definition language capable of interfacing with said CORBA platform.

28. The method as claimed in claim 26, wherein said step of recovering said data signals from said agent communication language messages comprises:

receiving signals in the form of a CORBA event encoded in an interface definition language syntax from said CORBA platform; and converting said interface definition language syntax signals to agent communication language messages containing said data signals.

29. The method as claimed in claim 26, wherein said data signals define an agent computing entity.

30. In a computing environment comprising a plurality of distributed physical resources, physical resource comprising a processor means and a data storage means, wherein a plurality of agent computing entities each incorporating a set of one or more objects and a messaging component are resident on said plurality of physical resources, a method of interacting first and second agent computing entities with each other comprising the steps of:

said first agent entity sending a message to said second said agent entity, said message containing data describing functionality available at said first agent entity; and said second agent entity responding to said first agent entity by sending a message signal containing data describing functionality available at said second agent entity, wherein said first and second agent computing entities are enabled to communicate with each other using a common set of syntax and a common set of message exchanges.

31. The method as claimed in claim 30, wherein said data describing functionality comprises ontology data describing meanings of agent communication language messages.

32. The method as claimed in claim 30, wherein a said agent computing entity performs a predetermined task autonomously of other ones of said plurality of agent computing entities.

33. The method as claimed in claim 30, wherein a said agent computing entity allow use of its functionality to at least one other of said agent computing entities.

34. The method as claimed in claim 30, wherein said message signals comprise agent communications language messages sent asynchronously over an externalization service of a CORBA platform.

* * * * *